United States Patent
Kim et al.

(10) Patent No.: US 12,468,446 B2
(45) Date of Patent: Nov. 11, 2025

(54) MEMORY SYSTEMS INCLUDING MEMORY CONTROLLERS THAT USE STATUS INPUT PINS TO CHECK MEMORY OPERATION STATUSES OF MEMORY DEVICES

(71) Applicant: Samsung Electronics Co., Ltd., Suwon-si (KR)

(72) Inventors: Suhyun Kim, Seoul (KR); Taeeun Park, Seoul (KR); Yukyeong Kim, Hwaseong-si (KR); Yejin Shin, Seoul (KR); Donggeun Lim, Yongin-si (KR); Seonghoon Woo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/986,021

(22) Filed: Nov. 14, 2022

(65) Prior Publication Data

US 2023/0152976 A1 May 18, 2023

(30) Foreign Application Priority Data

Nov. 15, 2021 (KR) .................. 10-2021-0157093
Feb. 8, 2022 (KR) .................. 10-2022-0016428

(51) Int. Cl.
*G06F 3/06* (2006.01)

(52) U.S. Cl.
CPC .......... *G06F 3/0611* (2013.01); *G06F 3/0653* (2013.01); *G06F 3/0679* (2013.01)

(58) Field of Classification Search
CPC .... G06F 3/0611; G06F 3/0653; G06F 3/0679; G06F 3/0658; G11C 7/1063; G11C 16/20
See application file for complete search history.

(56) References Cited

U.S. PATENT DOCUMENTS

| 6,888,733 B2 | 5/2005 | Jang et al. |
| 8,218,374 B2 | 7/2012 | Nakamura et al. |
| (Continued) | | |

FOREIGN PATENT DOCUMENTS

| KR | 20170086345 A | 7/2017 |
| KR | 20180019418 A | 2/2018 |
| (Continued) | | |

OTHER PUBLICATIONS

Extended European Search Report for EP 22207415.5 mailed May 3, 2023, 6 pages.

*Primary Examiner* — Nanci N Wong
(74) *Attorney, Agent, or Firm* — Wolf, Greenfield & Sacks, P.C.

(57) ABSTRACT

A memory system may include a plurality of first memory devices; and a memory controller that may include a first chip enable (CE) pin configured to output a first CE signal that enables selectively any one of the first memory devices and a first status input pin configured to receive a first output signal indicating a memory operation status of an enabled first memory device from among the first memory devices in a first memory operation status checking period. In the first memory operation status checking period, the first output signal has one of a first level to indicate a first status of the memory operation status of the enabled first memory device, a second level to indicate a second status of the memory operation status of the enabled first memory device, or a third level to indicate a disabled status of the first memory devices.

18 Claims, 19 Drawing Sheets

(56) References Cited

U.S. PATENT DOCUMENTS

| | | |
|---|---|---|
| 8,560,764 B2 | 10/2013 | Huffman et al. |
| 9,507,704 B2 | 11/2016 | Tuers et al. |
| 9,524,778 B2 | 12/2016 | Kim |
| 10,187,062 B1 * | 1/2019 | Shimizu ............... G11C 29/028 |
| 10,191,692 B2 | 1/2019 | Shin |
| 10,346,087 B2 | 7/2019 | Woo et al. |
| 10,515,704 B2 | 12/2019 | Chun |
| 10,534,561 B1 | 1/2020 | Yuan et al. |
| 11,037,626 B2 | 6/2021 | Kim et al. |
| 2006/0023500 A1 | 2/2006 | Kawabata et al. |
| 2011/0063909 A1 * | 3/2011 | Komatsu ................. G11C 29/28 |
| | | 365/185.11 |
| 2017/0206037 A1 * | 7/2017 | Shin ...................... G06F 3/0653 |
| 2018/0052639 A1 * | 2/2018 | Woo ..................... G11C 7/1063 |
| 2019/0324679 A1 | 10/2019 | Woo et al. |
| 2020/0348888 A1 * | 11/2020 | Kim ...................... G06F 3/0679 |
| 2021/0181985 A1 | 6/2021 | Shin |
| 2021/0295884 A1 | 9/2021 | Kim et al. |
| 2022/0057965 A1 * | 2/2022 | Hwang ............... G06F 13/4086 |
| 2023/0108751 A1 * | 4/2023 | Lee ........................ G11C 16/10 |
| | | 711/154 |

FOREIGN PATENT DOCUMENTS

| | | |
|---|---|---|
| KR | 20190044349 A | 4/2019 |
| KR | 20200063833 A | 6/2020 |
| KR | 20210077451 A | 6/2021 |

* cited by examiner

[1st Memory Group]

[2nd Memory Group]

MEMORY SYSTEMS INCLUDING MEMORY CONTROLLERS THAT USE STATUS INPUT PINS TO CHECK MEMORY OPERATION STATUSES OF MEMORY DEVICES

CROSS-REFERENCE TO RELATED APPLICATIONS

This application is based on and claims priority under 35 U.S.C. § 119 to Korean Patent Application Nos. 10-2021-0157093, filed on Nov. 15, 2021, and 10-2022-0016428, filed on Feb. 8, 2022, in the Korean Intellectual Property Office, and the entire contents of the above-identified applications are incorporated by reference herein.

TECHNICAL FIELD

The present disclosure relates to interface methods of memory systems, and more particularly, to memory systems including memory controllers that check the memory operation statuses of memory devices.

BACKGROUND

In a memory system that includes one or more non-volatile memory devices, a memory operation status of each of the non-volatile memory devices may be checked by the memory controller as part of controlling the non-volatile memory devices. In particular, in a multi-way memory system, to check the memory operation status of each memory device, the memory controller may provide a status check command to each memory device, and each memory device may provide a memory operation status to the memory controller in response to the status check command. When the memory controller checks the memory operation status of the memory devices by using the status check command, an ability to reduce the input/output (I/O) occupancy time of the memory devices may become limited, and thus, the performance of an overall memory system may decrease.

SUMMARY

The present disclosure provides a memory system configured to reduce an input/output (I/O) occupancy time of a plurality of memory devices when a memory controller checks a memory operation status of each of the memory devices by using status input pins.

According to some aspects of the inventive concepts, there is provided a memory system including a plurality of first memory devices; and a memory controller including a first chip enable (CE) pin configured to output a first CE signal to enable selectively any one of the first memory devices and a first status input pin configured to receive a first output signal indicating memory operation status of an enabled first memory device from among the first memory devices during a first memory operation status checking period. In the first memory operation status checking period, the first output signal has one of a first level to indicate a first status of the memory operation status of the enabled first memory device, a second level to indicate a second status of the memory operation status of the enabled first memory device, or a third level to indicate a disabled status of the first memory devices.

According to some aspects of the inventive concepts, there is provided a memory system including a plurality of memory devices each including a status output pin; and a memory controller including a status input pin connected to the status output pins of the memory devices and a chip enable (CE) pin configured to output a chip enable CE signal to enable the memory devices selectively. In a memory operation status checking period, each of the memory devices is configured to output a status signal, the status signal having one of a first level that indicates a first status of a memory operation status or a second level that indicates a second status of the memory operation status during a first enabled period according to the CE signal and has a third level in a first disabled period according to the CE signal.

According to some aspects of the inventive concepts, there is provided a memory system including a plurality of memory devices each configured to output a status signal that indicates a memory operation status during an enabled period and after completing a memory operation; and a memory controller including a status input pin configured to receive an output signal generated from a plurality of status signals of the memory devices. The memory controller is configured to check the memory operation status of an enabled memory device from among the memory devices based on a level of the output signal, and the memory operation status includes at least one of whether preparation for a memory operation following a memory operation in response to a command from the memory controller is completed and whether the memory operation in response to the command is successful.

BRIEF DESCRIPTION OF THE DRAWINGS

Some aspects of the present disclosure will be more clearly understood from the following detailed description taken in conjunction with the accompanying drawings in which.

DETAILED DESCRIPTION OF THE EMBODIMENTS

Figure 1A:
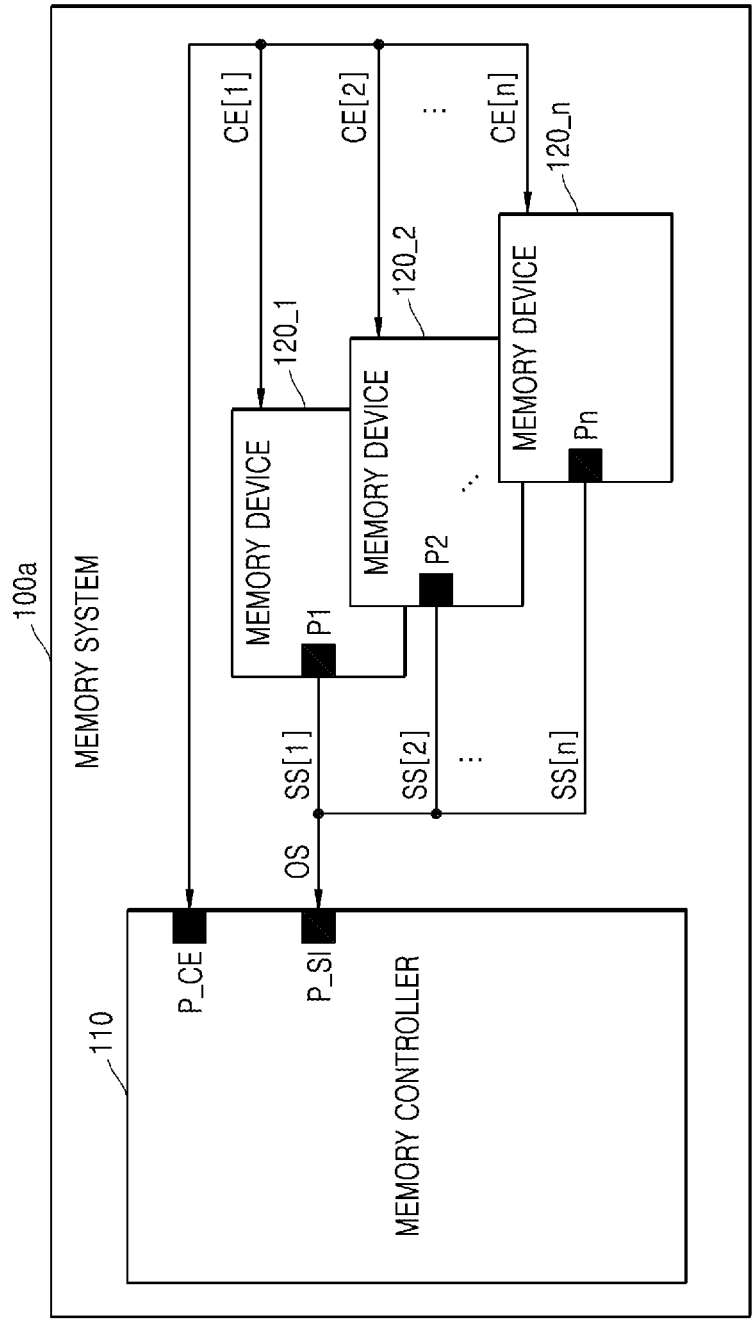
FIGS. 1A and 1B are schematic views of memory systems according to some example embodiments of the inventive concepts.
Figure 1B:
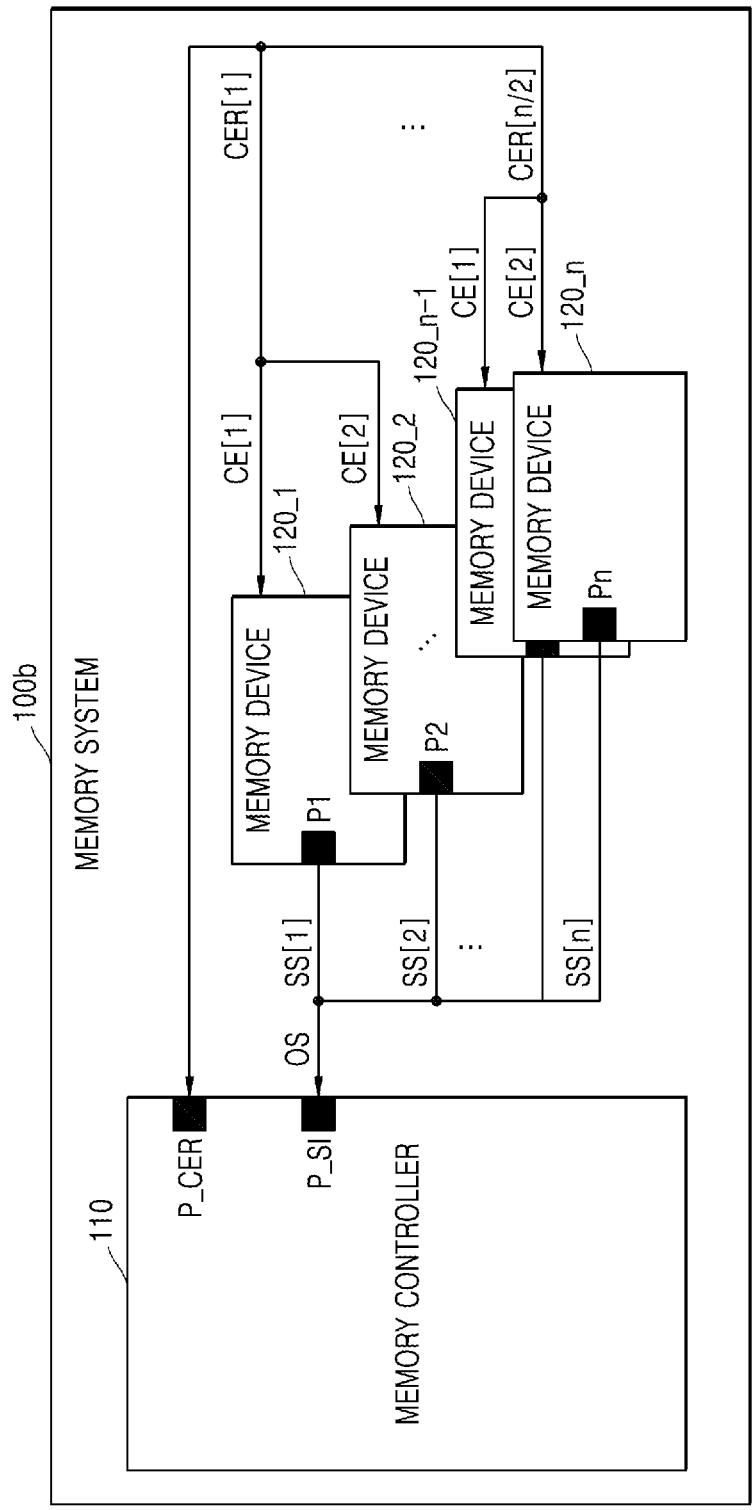

FIGS. 1A and 1B are schematic views of memory systems 100a and 100b according to some example embodiments of the inventive concepts.

Referring to FIG. 1A, a memory system 100a may include a memory controller 110 and n memory devices 120_1 to 120_n (where n is an integer greater than or equal to 1), which may be referred to herein as first to n-th memory devices 120_1 to 120_n. The memory controller 110 and the first to n-th memory devices 120_1 to 120_n may be connected through one channel. In other words, the example memory system 100a of FIG. 1A may be one in which one channel includes n ways. Herein with reference to some embodiments, a way may be referred to as a sub-channel, and a way may be defined as an input/output line of a memory device.

The first to n-th memory devices 120_1 to 120_n may be implemented as non-volatile memory devices. For example, the first to n-th memory devices 120_1 to 120_n may be implemented as flash memories, phase change RAMs (PRAMs), ferroelectric RAMs (FRAMs), magnetic RAMs (MRAMs), etc. Furthermore, when implemented as flash memories, the first to n-th memory devices 120_1 to 120_n may include a memory cell array having a 2-dimensional structure or a 3-dimensional structure.

In some example embodiments, the memory controller 110 may include a status input pin P_SI and a CE pin P_CE. In some embodiments of the present specification, the status input pin P_SI may be implemented as a ready and busy (RnB) pin, and it may be described that the status input pin P_SI and the CE pin P_CE are arranged in a memory controller. The first to n-th memory devices 120_1 to 120_n may include first to n-th state output pins P1 to Pn. Herein, it may be described that the first to n-th status output pins P1 to Pn are respectively arranged in the memory devices 120_1 to 120_n. The first to n-th state output pins P1 to Pn may be connected to one status input pin P_SI of the memory controller 110. In some embodiments, the first to n-th state output pins P1 to Pn may be connected to the status input pin P_SI of the memory controller 110 through a wired AND gate or a wired OR gate.

The memory controller 110 may transmit commands (e.g., a program command, a read command, and/or an erase command) for a memory operation to the first to n-th memory devices 120_1 to 120_n. The memory controller 110 may further include a command pin (not shown) and may transmit commands to the first to n-th memory devices 120_1 to 120_n through the command pin.

The memory controller 110 may generate chip enable (CE) signals CE[1] to CE[n] for enabling selectively any one of the first to n-th memory devices 120_1 to 120_n. The memory controller 110 may transmit the CE signals CE[1] to CE[n] to the first to n-th memory devices 120_1 to 120_n through the CE pin P_CE.

The memory controller 110 may use the CE signals CE[1] to CE[n] to select a memory device from among the first to n-th memory devices 120_1 to 120_n that serves as a destination of commands. According to some embodiments, to control a program operation of a first memory device 120_1, the memory controller 110 may transmit a program command to the first to n-th memory devices 120_1 to 120_n through the command pin (not shown), and, at the same time, generate the CE signals CE[1] to CE[n] to enable only the first memory device 120_1 and transmit the generated CE signals CE[1] to CE[n] to the first to n-th memory devices 120_1 to 120_n. The first memory device 120_1, which is enabled, may perform a program operation in response to the program command received from the memory controller 110.

The memory controller 110 may transmit a plurality of commands and the CE signals CE[1] to CE[n] to the first to n-th memory devices 120_1 to 120_n, and the first to n-th memory devices 120_1 to 120_n may be sequentially enabled to perform memory operations corresponding to received commands, respectively.

In some example embodiments, the first to n-th memory devices 120_1 to 120_n may output first to n-th status signals SS[1] to SS[n] that indicate memory operation status related to results of memory operations. The first to n-th status signals SS[1] to SS[n] may be outputted through the first to n-th state output pins P1 to Pn based on the CE signals CE[1] to CE[n] in or during a memory operation status checking period. According to some example embodiments of the inventive concepts, the memory operation status may include at least one of whether a memory operation following a memory operation in response to a corresponding command is ready or whether to pass the memory operation in response to the corresponding command. In greater detail, the memory operation status may include at least one of whether a second read operation following a first read operation in response to a read command may be performed, whether a program operation in response to a program command is passed or successful, and/or whether an erase operation in response to an erase command is passed or successful. In the present specification, the memory operation status may also be referred to as an operation status.

In some embodiments, the first to n-th memory devices 120_1 to 120_n may output the first to n-th status signals SS[1] to SS[n] in a period other than the memory operation status checking period, and, at this time, the first to n-th status signals SS[1] to SS[n] do not indicate memory operation status. According to some embodiments, during an internal status checking period, the first to n-th memory devices 120_1 to 120_n may output the first to n-th status signals SS[1] to SS[n] that indicate an internal status. According to some example embodiments, an internal status may indicate a busy status indicating that an operation in response to a command from the memory controller 110 is being performed, or a ready status indicating that an operation in response to a command is completed (or a next memory operation is available). Herein, the internal status may be referred to as a busy/ready status.

According to some example embodiments, the first memory device 120_1 may output a first status signal SS[1] that has a first level to indicate a first status of a memory operation status or a second level to indicate a second status of the memory operation status when the first memory device 120_1 is enabled. The first memory device 120_1 may output a first status signal SS[1] that has a third level when the first memory device 120_1 is disabled. For example, the first memory device 120_1 may output the first status signal SS[1] that has a high-level (or low-level) to indicate pass or success of a program operation or a low-level (or high-level) to indicate failure of the program operation when the first memory device 120_1 is enabled, and may output the first status signal SS[1] that has a high-impedance level when the first memory device 120_1 is disabled. In the same regard as that the first memory device 120_1 outputs the first status signal SS[1], second to n-th memory devices 120_2 to 120_n may output second to n-th status signals SS[2] to SS[n].

In some example embodiments, to check the memory operation status of the first to n-th memory devices 120_1 to 120_n in or during the memory operation status checking period, the memory controller 110 may transmit the CE signals CE[1] to CE[n] to the first to n-th memory devices 120_1 to 120_n, thereby sequentially enabling the first to n-th memory devices 120_1 to 120_n. In some embodiments, the memory controller 110 may periodically or aperiodically enable each of the first to n-th memory devices 120_1 to 120_n a plurality of number of times in the memory operation status checking period, thereby checking the memory operation status of the first to n-th memory devices 120_1 to 120_n over a plurality of number of times.

In some example embodiments, based on the CE signals CE[1] to CE[n] and an output signal OS received through the status input pin P_SI in the memory operation status checking period, the memory controller 110 may check the memory operation status of the first to n-th memory devices 120_1 to 120_n. The output signal OS may be a result of logical calculations of the first to n-th status signals SS[1] to SS[n] output from the first to n-th memory devices 120_1 to 120_n. For example, the output signal OS may have any one of a first level indicating a first status of the memory operation status of an enabled memory device from among the first to n-th memory devices 120_1 to 120_n, a second level indicating a second status of the memory operation status of the enabled memory device, and a third level indicating the status in which all of the first to n-th memory devices 120_1 to 120_n are disabled. The memory controller 110 may recognize a currently enabled memory device through the CE signals CE[1] to CE[n] and may check the memory operation status of the currently enabled memory device based on the level of a currently received output signal OS.

In some example embodiments, the memory controller 110 and the first to n-th memory devices 120_1 to 120_n may set specifications of each other related to a memory operation status checking period in advance. For example, the specification related to a memory operation status checking period may be defined in various ways, e.g., a start time and a duration of a memory operation status check period.

In some example embodiments, based on the CE signals CE[1] to CE[n] and an output signal OS received through the status input pin P_SI in the internal status checking period, the memory controller 110 may check the internal status of the first to n-th memory devices 120_1 to 120_n. In some embodiments, the internal status checking period may precede a memory operation status checking period, and the first to n-th memory devices 120_1 to 120_n may prepare for the memory operation status checking period that is subsequent to the internal status checking period. In greater detail, the first to n-th memory devices 120_1 to 120_n may reset the first to n-th status signals SS[1] to SS[n] to prepare for a memory operation status checking period with reference to the specifications (e.g., the specifications discussed above) related to a memory operation status checking period. For example, reset levels of the first to n-th status signals SS[1] to SS[n] may be determined according to a first level and a second level set to respectively indicate a first status and a second status of the memory operation status, respectively.

The first to n-th memory devices 120_1 to 120_n may reset the first to n-th status signals SS[1] to SS[n] to prepare for a next internal status checking period or a next memory operation status checking period when the memory operation status checking period is ended.

In the memory system 100a according to some example embodiments of the inventive concepts, the memory controller 110 may transmit the CE signals CE[1] to CE[n] instead of a status check command to the first to n-th memory devices 120_1 to 120_n and receive the output signal OS through one status input pin P_SI, thereby more rapidly checking the memory operation status of the first to n-th memory devices 120_1 to 120_n based on the output signal OS. Therefore, the time for occupying the input/output of the first to n-th memory devices 120_1 to 120_n for checking the memory operation status of the memory controller 110 may be reduced, and thus the overall performance of the memory system 100a may be improved.

Referring further to FIG. 1B, and in contrast to the CE signals CE[1] to CE[n] of the memory system 100a of FIG. 1A, a memory system 100b may enable selectively the first to n-th memory devices 120_1 to 120_n by using CE reduction commands CER [1] to CER [n/2]. The CE reduction commands CER [1] to CER [n/2] may be divided into CE signals CE[1] and CE[2] and provided to the first to n-th memory devices 120_1 to 120_n.

Since memory systems 100a and 100b shown in FIGS. 1A and 1B are merely some example embodiments, the inventive concepts are not limited thereto, and various embodiments capable of checking the memory operation status of the first to n-th memory devices 120_1 to 120_n by using the status input pin P_SI may be applied to the memory systems 100a and 100b.

Figure 2:
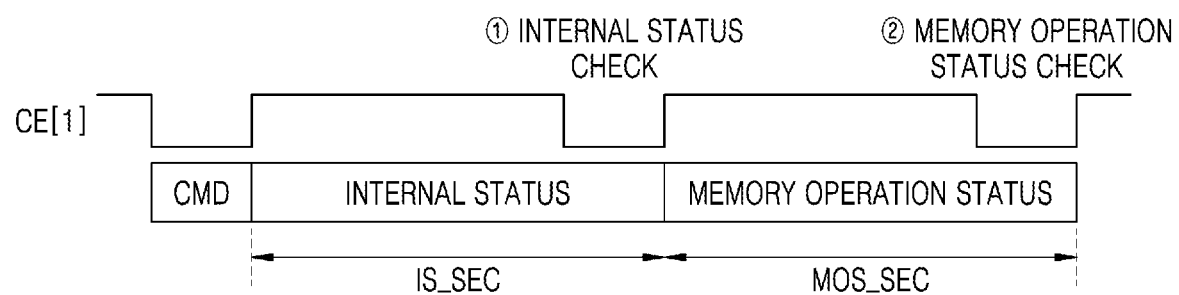
FIG. 2 is a timing diagram for describing an operation of a first memory device of FIG. 1A.

FIG. 2 is a timing diagram for describing the operation of the first memory device 120_1 of FIG. 1A. In FIG. 2, FIG. 1A is further referred to for better understanding. Also, it is presumed that the first memory device 120_1 is enabled in a period in which a CE signal CE[1] is at a low level and the first memory device 120_1 is disabled in a period in which the CE signal CE[1] is at a high level. However, this is merely one example embodiment, and in some embodiments the first memory device 120_1 may be enabled in a period in which the CE signal CE[1] is at a high level.

Referring to FIG. 2, the first memory device 120_1 may receive a command from the memory controller 110 in a period in which the first memory device 120_1 is enabled according to a low-level CE signal CE[1]. The first memory device 120_1 may perform a memory operation corresponding to the command in response to the command. In an internal status checking period IS_SEC, the first memory device 120_1 may generate a low-level first status signal SS[1] indicating a busy status as an internal status while a corresponding memory operation is being performed and generate a high-level first status signal SS[1] indicating a ready status as the internal status when the corresponding memory operation is completed. Meanwhile, the first memory device 120_1 may output a high-impedance level first status signal SS[1] in a period in which the first memory device 120_1 is disabled according to the high-level CE signal CE[1] and output a low-level first status signal SS[1] or a high-level first status signal SS[1] indicating an internal status in a period in which the first memory device 120_1 is enabled by a low-level CE signal CE[1] for checking an internal status.

In a memory operation status checking period MOS_SEC after the internal status checking period IS_SEC, the first memory device 120_1 may generate the first status signal SS[1] indicating the memory operation status. For example, when a corresponding memory operation is a program operation, the first memory device 120_1 may output a low-level first status signal SS[1] indicating failure of the program operation when the program operation fails and output a high-level first status signal SS[1] indicating pass or success of the program operation when the program operation passes or succeeds. Meanwhile, the first memory device 120_1 may output a high-impedance level first status signal SS[1] in a period in which the first memory device 120_1 is disabled according to the high-level CE signal CE[1], and may output a low-level first status signal SS[1] or a high-level first status signal SS[1] indicating a memory operation status in a period in which the first memory device 120_1 is enabled by a low-level CE signal CE[1] for checking a memory operation status.

In some example embodiments, the first memory device 120_1 may reset the level of the first status signal SS[1] before the memory operation status checking period MOS_SEC starts and after the internal status checking period IS_SEC ends. For example, after the internal status checking period IS_SEC ends, the first memory device 120_1 may reset the high-level first status signal SS[1] to a low level.

Meanwhile, FIG. 2 shows an example in which the memory controller 110 enables the first memory device 120_1 once in each of the internal status checking period IS_SEC and the memory operation status checking period MOS_SEC. However, this is merely one example embodiment, and the inventive concepts are not limited thereto. The first memory device 120_1 may be enabled a plurality of number of times in each of the internal status checking period IS_SEC and the memory operation status checking period MOS_SEC. Stated differently, the memory controller 110 might not know exactly at which timing the first memory device 120_1 will change the level of the first status signal SS[1] by reflecting an internal status or a memory operation status, and as such the memory controller 110 may enable the first memory device 120_1 a plurality of number of times in the internal status checking period IS_SEC and the memory operation status checking period MOS_SEC according to an agreement with or specification of the first memory device 120_1.

The memory controller 110 may monitor the level of the output signal OS reflected by the first status signal SS[1] of the first memory device 120_1 that is enabled a plurality of number of times, thereby checking the internal status and memory operation status of the first memory device 120_1.

Also, although FIG. 2 shows that the internal status checking period IS_SEC and the memory operation status checking period MOS_SEC are successively arranged, it is merely one example embodiment, and the inventive concepts are not limited thereto. For example, the internal status checking period IS_SEC and the memory operation status checking period MOS_SEC may be spaced apart from each other by a certain interval.

The descriptions given above with reference to FIG. 2 may also be applied to second to n-th memory devices 120_2 to 120_n of FIG. 1A.

Figure 3:
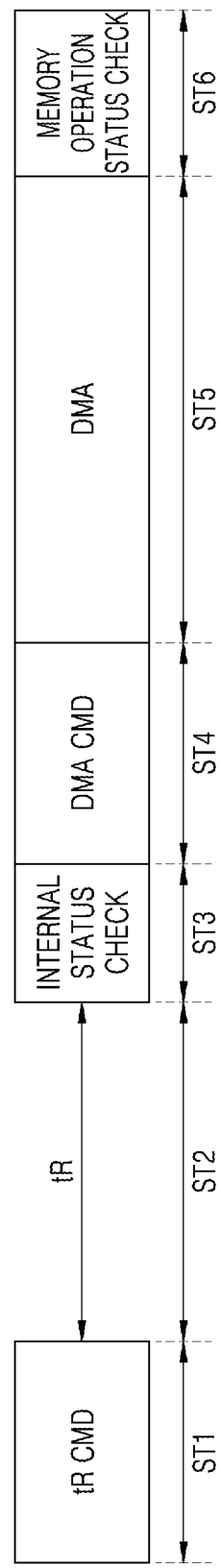
FIG. 3 is a timing diagram for describing an operation of checking an internal status and a read operation status of the first memory device in the memory system of FIG. 1A.

FIG. 3 is a timing diagram for describing an operation of checking an internal status and a read operation status of the first memory device 120_1 in the memory system 100a of FIG. 1A. In FIG. 3, a read operation status, which is an example of a memory operation status, will be mainly described.

Referring to FIG. 3, the first memory device 120_1 may receive a read command tR CMD during a period 'ST1' and may perform a read operation tR according to the read command tR CMD during a period 'ST2'. The memory controller 110 may check the internal status of the first memory device 120_1 by using the CE signal CE[1] during a period 'ST3' (e.g., the internal status checking period). After a status is checked, the memory controller 110 may transmit a direct memory access (DMA) command to the first memory device 120_1 in a period 'ST4' and, according to a DMA operation, during a period 'ST5', the first memory device 120_1 may transmit read data to the memory controller 110. The memory controller 110 may check the read operation status of the first memory device 120_1 by using the CE signal CE[1] during a period 'ST6' (e.g., the memory operation status checking period). In other words, the memory controller 110 may check whether the first memory device 120_1 is ready to operate according to a next command.

The descriptions given above with reference to FIG. 3 may also be applied to second to n-th memory devices 120_2 to 120_n of FIG. 1A.

The memory controller 110 according to some example embodiments of the inventive concepts may check more quickly the memory operation status of the first to n-th memory devices 120_1 to 120_n by using the CE signals CE[1] to CE[n] and the status input pin P_SI without a separate memory status check command. Furthermore, the memory controller 110 may minimize the number of pins needed for the memory controller 110 by using the status input pin P_SI to check the internal status of the first to n-th memory devices 120_1 to 120_n, thereby providing advantages for memory design and cost.

Figure 4:
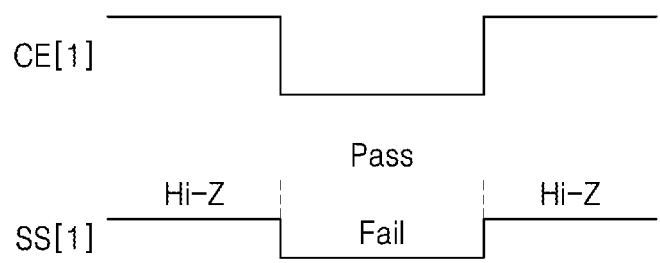
FIG. 4 is a timing diagram showing a first status signal of FIG. 1A according to some example embodiments of the inventive concepts.

FIG. 4 is a timing diagram showing one example embodiment of the first status signal SS[1] of FIG. 1A according to some aspects of the present disclosure. The embodiment of the first status signal SS[1] shown in FIG. 4 may also be applied to second to n-th status signals SS[2] to SS[n], and, to help the understanding of FIG. 4, descriptions below will be given with reference to FIG. 1A.

Referring to FIG. 4, the first memory device 120_1 may output the first status signal SS[1] having a high-impedance level Hi-Z in a period in which the first memory device 120_1 is disabled according to the high-level CE signal CE[1]. In a period in which the first memory device 120_1 is enabled according to the low-level CE signal CE[1], the first memory device 120_1 may output the first status signal SS[1] having a high level when a result of a program operation, a read operation, or an erase operations is a pass status and output the first status signal SS[1] having a low level when a result of a program operation, a read operation, or an erase operations is a fail status. Meanwhile, when a result of a read operation of the first memory device 120_1 is a pass, it may be interpreted that the first memory device 120_1 is in a state in which preparation for a next operation according to a next command is completed after the corresponding read operation.

However, this is merely one example embodiment, and the inventive concepts are not limited thereto. For example, in a period in which the first memory device 120_1 is enabled, the first memory device 120_1 may output the first status signal SS[1] having a low level when a result of a program operation, a read operation, or an erase operations is pass and output the first status signal SS[1] having a high level when a result of a program operation, a read operation, or an erase operations is fail. Furthermore, the level of the first status signal SS[1] may vary according to the type of a memory operation. For example, the first memory device 120_1 may output the first status signal SS[1] having a; low level when a result of a program operation is a pass status, whereas the first memory device 120_1 may output the first status signal SS[1] having a high level when a result of an erase operation is a pass status. Levels of the first status signal SS[1] respectively set for types of memory operations of the first memory device 120_1 may be previously agreed with the memory controller 110 (e.g., via a specification).

Figure 5A:
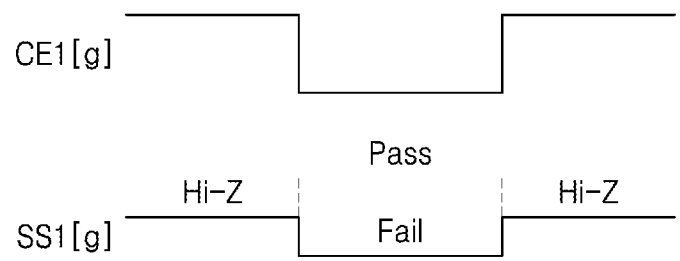
FIGS. 5A and 5B are timing diagrams for describing status signals set for each memory group according to some example embodiments of the inventive concepts.
Figure 5B:
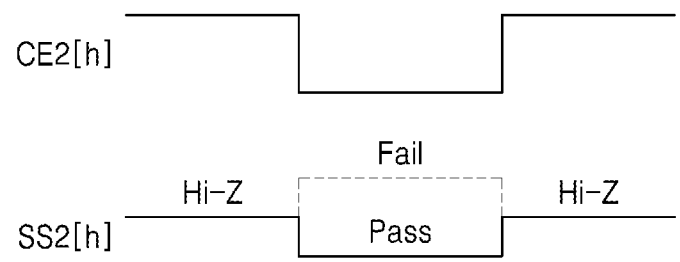

FIGS. 5A and 5B are timing diagrams for describing status signals set for each memory group according to some example embodiments of the inventive concepts. In FIGS. 5A and 5B, a first memory group and a second memory group may be coupled to different status input pins of a memory controller, respectively. In some embodiments, the first memory group may include first memory devices 220_1 to 220_g of FIG. 11 (g is an integer equal to or greater than 1), as described herein, and the second memory group may include second memory devices 230_1 to 230_h (h is an integer equal to or greater than 1).

FIG. 5A shows a status signal SS1[g] of a first memory device 220_g (FIG. 11) included in the first memory group, and FIG. 5B shows a status signal SS2[h] of a second memory device 230_h (FIG. 11) included in the second memory group.

Referring to FIG. 5A, the first memory device 220_g (FIG. 11) may output the status signal SS1[g] having the high-impedance level Hi-Z in period in which the first memory device 220_g (FIG. 11) is disabled according to a high-level CE signal CE1[g]. In a period in which the first memory device 220_g (FIG. 11) is enabled according to the low-level CE signal CE1[g], the first memory device 220_g (FIG. 11) may output the status signal SS1[g] having a high level when a result of a program operation, a read operation, or an erase operations is pass, and may output the status signal SS1[g] having a low level when a result of a program operation, a read operation, or an erase operations is fail.

Referring to FIG. 5B, the second memory device 230_h (FIG. 11) may output a status signal SS2[h] having the high-impedance level Hi-Z in period in which the second memory device 230_h (FIG. 11) is disabled according to a high-level CE signal CE2[h]. In a period in which the second memory device 230_h is enabled according to the low-level CE signal CE2[h], the second memory device 230_h may output the status signal SS2[h] having a high level when a result of a program operation, a read operation, or an erase operations is pass and may output the status signal SS2[h] having a low level when a result of a program operation, a read operation, or an erase operations is fail.

As described above, in a memory system according to some example embodiments of the inventive concepts, by setting levels of status signals of the first memory group and the second memory group differently, each memory group may be operated independently or differently for checking a memory operation status. A detailed embodiment thereof will be described later in FIG. 11.

Figure 6A:
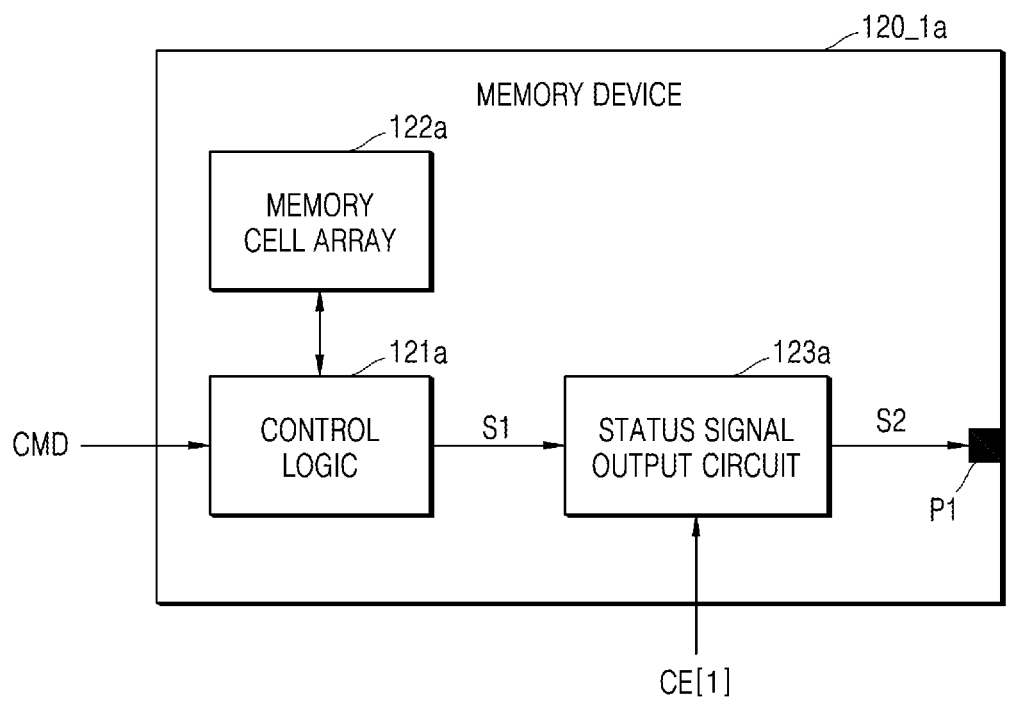
FIG. 6A is a block diagram showing a first memory device according to some example embodiments of the inventive concepts.
Figure 6B:
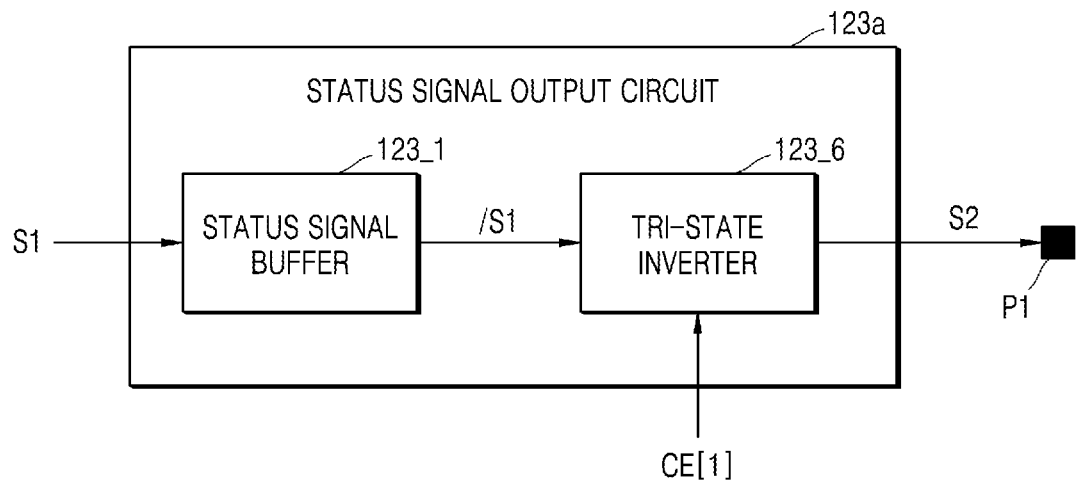
FIG. 6B is a block diagram showing a status signal output circuit of FIG. 6A.
Figure 6C:
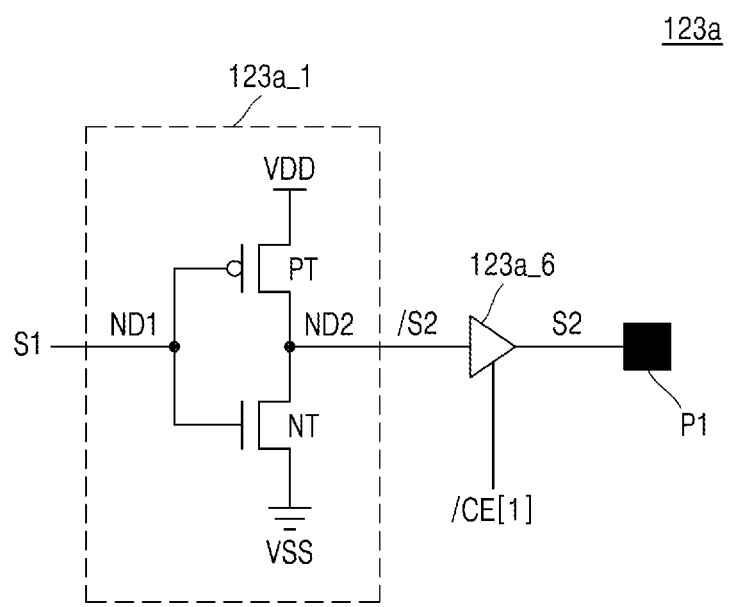
FIG. 6C is a circuit diagram showing the status signal output circuit of FIG. 6A.

FIG. 6A is a block diagram showing a first memory device 120_1a according to some example embodiments of the inventive concepts, FIG. 6B is a block diagram showing a status signal output circuit 123a of FIG. 6A, and FIG. 6C is a circuit diagram showing the status signal output circuit 123a of FIG. 6A. The first memory device 120_1a of FIG. 6A may correspond to the first memory device 120_1 of FIG. 1A, and a status signal S2 of FIGS. 6A to 6C may correspond to the first status signal SS[1] of FIG. 1A.

Referring to FIG. 6A, the first memory device 120_1a may include a control logic 121a, a memory cell array 122a, and the status signal output circuit 123a. The control logic 121a may receive a command CMD and perform a memory operation corresponding to the command CMD. For example, the control logic 121a may program certain data into the memory cell array 122a when the command CMD is a program command, read data from the memory cell array 122a when the command CMD is a read command, and/or erase data of the memory cell array 122a when the command CMD is an erase command.

In some example embodiments, the control logic 121a may perform a memory operation corresponding to the command CMD and provide a signal S1 indicating an internal status regarding a progress status of the corresponding memory operation in the internal status checking period to the status signal output circuit 123a. For example, in the internal status checking period, the control logic 121a may provide to the status signal output circuit 123a the signal S1 indicating a busy status that a corresponding memory operation is being performed, or may provide the signal S1 indicating a ready status that the corresponding memory operation is completed. The status signal output circuit 123a may receive the CE signal CE[1], and may output the signal S1, which is received from the control logic 121a in a period where the first memory device 120_1a is enabled, as the status signal S2 through a first status output pin P1 during an internal status checking period, The status signal output circuit 123a may output the status signal S2 having a high-impedance level regardless of the signal S1 through the first status output pin P1 in a period in which the first memory device 120_1a is disabled. In some example embodiments, the control logic 121a may reset the level of the signal S1 when the internal status checking period ends.

In some example embodiments, the control logic 121a may provide the signal S1 indicating the memory operation status to the status signal output circuit 123a in the memory operation status checking period subsequent to the internal status checking period. The status signal output circuit 123a may receive the CE signal CE[1] and may output the signal S1, which is received from the control logic 121a in a period where the first memory device 120_1a is enabled, as the status signal S2 through a first status output pin P1 during a memory operation status checking period, The status signal output circuit 123a may output the status signal S2 having a high-impedance level regardless of the signal S1 through the first status output pin P1 in a period in which the first memory device 120_1a is disabled. In some example embodiments, the control logic 121a may reset the level of the signal S1 when the memory operation status checking period ends.

Further referring to FIG. 6B, the status signal output circuit 123a may include a status signal buffer 123a_1 and a 3-phase (or tri-state) inverter 123a_6. The status signal buffer 123a_1 may invert and amplify the signal S1 provided from the control logic 121a and provide an inverted amplified signal/S1 to the 3-phase inverter 123a_6. The 3-phase inverter 123a_6 may re-invert the inverted amplified signal/S1 based on the CE signal CE[1] and may output the same as the status signal S2 or as the status signal S2 having a high-impedance level.

Further referring to FIG. 6C, the status signal buffer 123a_1 may include a p-channel metal oxide silicon (pMOS) transistor PT and an n-channel metal oxide silicon (nMOS) transistor NT. In greater detail, a gate of the pMOS transistor PT may be connected to a first node ND1, a source of the pMOS transistor PT may be connected to a power terminal VDD, and a drain of the pMOS transistor PT may be connected to a second node ND2. A gate of the nMOS transistor NT may be connected to the first node ND1, a source of the nMOS transistor NT may be connected to a ground terminal VSS, and a drain of the nMOS transistor NT may be connected to the second node ND2.

When the signal S1 input to the first node ND1 is at a low level, the pMOS transistor PT may be turned on and the nMOS transistor NT may be turned off. Therefore, a high-level signal/S2 may be output to the second node ND2. Also, when the first signal S1 input to the first node ND1 is at a high level, the pMOS transistor PT may be turned off and the nMOS transistor NT may be turned on. Therefore, a low-level signal/S2 may be output to the second node ND2. In other words, the status signal buffer 123a_1 may invert and amplify the first signal S1 and output the same to the second node ND2.

The 3-phase inverter 123a_6 may output the status signal S2, which is generated by inverting the signal/S2 of the second node ND2 when an inverted CE signal/CE[1] is at a high level, through the first status output pin P1. Also, when the inverted CE signal/CE[1] is at a low level, the 3-phase inverter 123a_6 may output a high-impedance level status signal S2 through the first status output pin P1.

Meanwhile, the circuit configuration of the status signal output circuit 123a shown in FIG. 6C is merely one example embodiment, and, without being limited thereto, various implementations for outputting the status signal S2 having three levels may be applied thereto.

Figure 7:
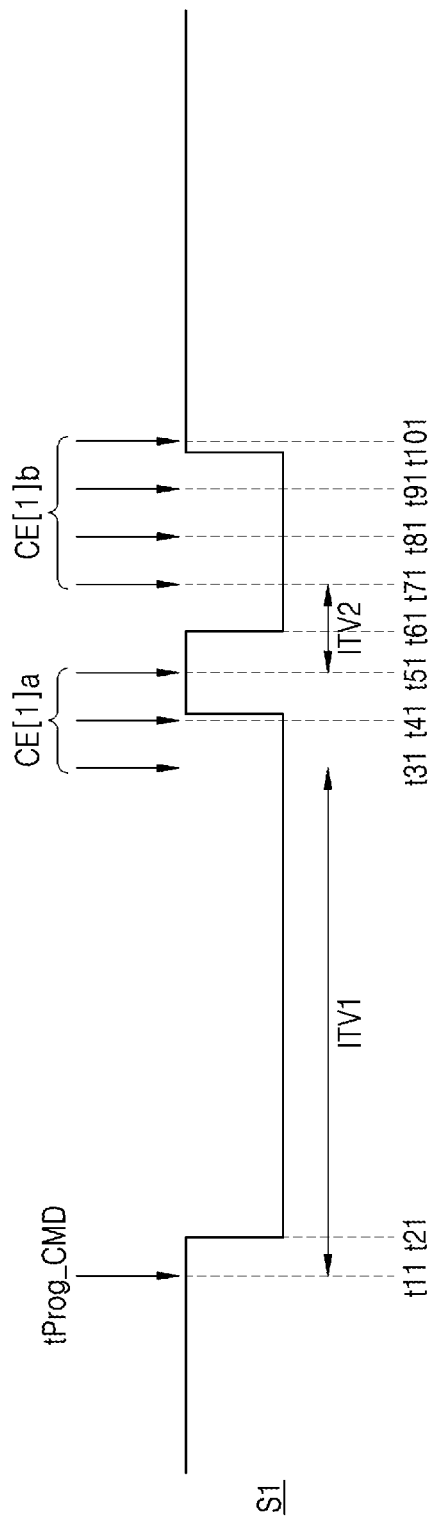
FIG. 7 is a timing diagram for describing a signal output from a control logic of FIG. 6A.

FIG. 7 is a timing diagram for describing the signal S1 output from the control logic 121a of FIG. 6A. In FIG. 7, FIG. 6A is further referred to for better understanding.

Referring to FIG. 7, the control logic 121a may receive a program command tProg_CMD at a time point 't11', start a program operation in response to the program command tProg_CMD at a time point 't21', and change the signal S1 from a high level to a low level indicating a busy status. Thereafter, the control logic 121a may change the signal S1 from a low level to a high level indicating a ready status when the program operation is completed.

The first memory device 120_1a may receive a CE signal CE[1] a having a level for enabling the first memory device 120_1a periodically or aperiodically from a time point 't31', which is a first interval ITV1 after the time point 't11', to a time point 't51'. The period from the time point 't31' to the time point 't51' may correspond to an internal status checking period. In response to the CE signal CE[1] a, the status signal output circuit 123a may output a low-level status signal S2 indicating a busy status at time points 't31' and 't41' and output a high-level status signal S2 indicating a ready status at the time point 't51'.

After the internal status checking period ends, the control logic 121a may change the signal S1 from a high level to a low level at a time point 't61'. Thereafter, the control logic 121a may check whether a corresponding program operation is a pass status and may generate the signal S1 indicating whether the corresponding program operation is a pass status. In greater detail, the control logic 121a may change the signal S1 from a low level to a high level indicating pass of the corresponding program operation.

The first memory device 120_1a may receive a CE signal CE[1] b having a level that enables the first memory device 120_1a periodically or aperiodically from a time point 't71', which is a second interval ITV2 after the time point 't51', to a time point 't101'. The period from the time point 't71' to the time point 't101' may correspond to a memory operation status checking period. In response to the CE signal CE[1] b, the status signal output circuit 123a may output a low-level status signal S2 at time points 't71', 't81', and 't91' and output a high-level status signal S2 indicating pass of a corresponding program operation at the time point 't101'. In some embodiments, when the corresponding program operation fails, the control logic 121a may generate a low-level signal S1 during a memory operation status checking period, and the status signal output circuit 123a may output a low-level status signal S2 indicating failure of the corresponding program operation during the memory operation status checking period.

In some example embodiments, the first interval ITV1, the second interval ITV2, the duration of the internal status checking period, and the duration of the memory operation status checking period may be specifications agreed to in advance between the first memory device 120_1a and the memory controller. In some embodiments, the duration of the internal status checking period and the duration of the memory operation status checking period may be the same as or different from each other.

Figure 8:
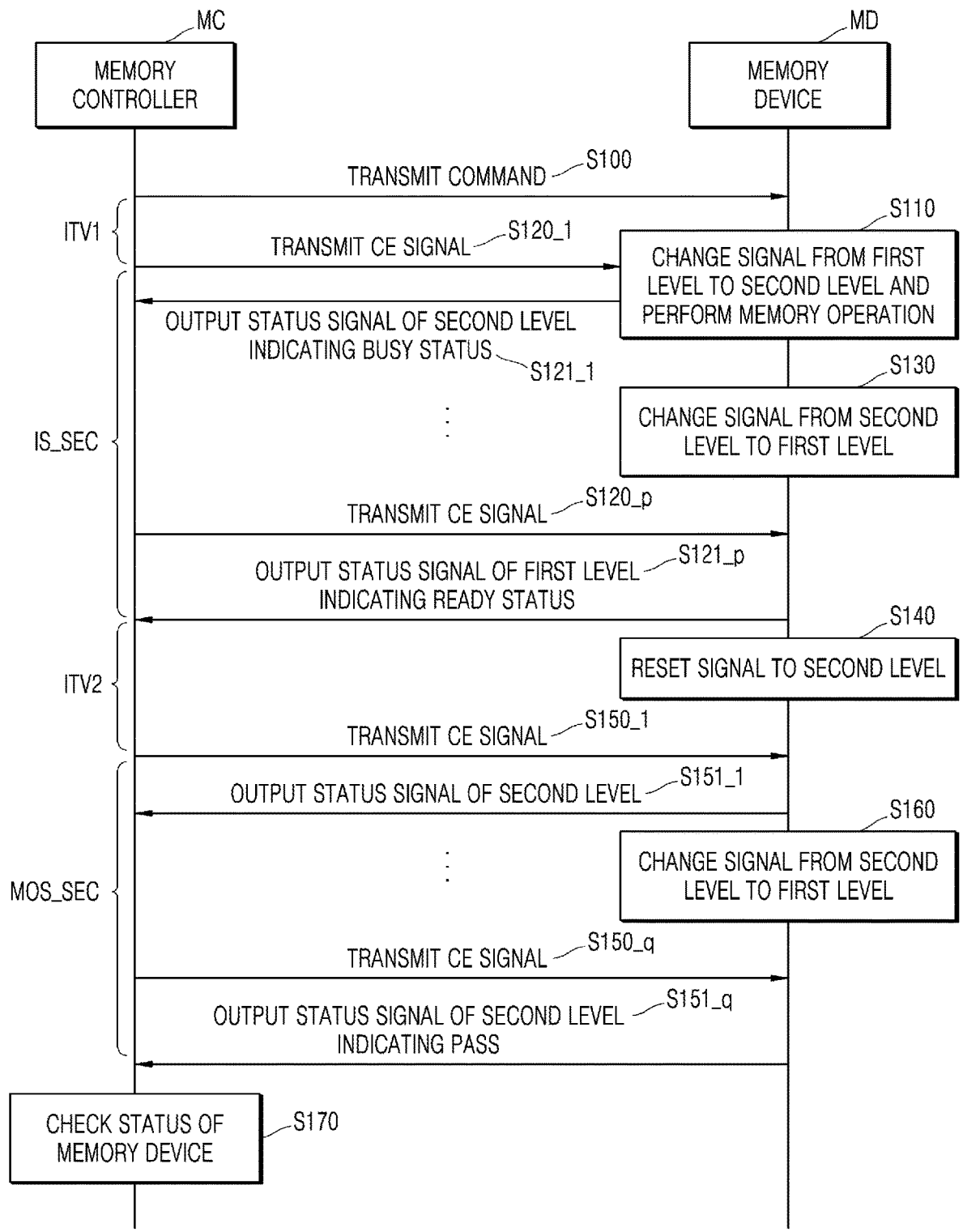
FIG. 8 is a flowchart of an operating method of a memory controller and a memory device according to some example embodiments of the inventive concepts.

FIG. 8 is a flowchart of a method of operating a memory controller MC and a memory device MD according to some example embodiments of the inventive concepts.

Referring to FIG. 8, in operation S100, the memory controller MC may transmit a command for controlling a memory operation to the memory device MD. In operation S110, the memory device MD may change a signal (corresponding to the signal S1 generated by the control logic 121a as described above in FIG. 6A) from a first level to a second level indicating a busy status and perform a memory operation corresponding to the command. After the first interval ITV1 from operation S100, the memory controller MC may transmit a CE signal for enabling the memory device MD to the memory device MD in operation S120_1. In operation S121_1, the memory device MD may output a status signal at the second level indicating a busy status to the memory controller MC in response to the CE signal. In operation S130, the memory device MD may change the signal (corresponding to the signal S1 generated by the control logic 121a as described above in FIG. 6A) from the second level to the first level indicating a ready status after completing a memory operation. In operation S120_p, the memory controller MC may transmit a CE signal for enabling the memory device MD to the memory device MD. In operation S121_p, the memory device MD may output a status signal at the first level indicating a ready status to the memory controller MC in response to the CE signal. In some example embodiments, the memory controller MC may periodically or aperiodically transmit CE signals for enabling the memory device MD 'p' times (where p is an integer equal to or greater than 1) in the internal status checking period IS_SEC to the memory device MD.

In operation S140, the memory device MD may reset the signal (corresponding to the signal S1 generated by the control logic 121a as described above in FIG. 6A) to the second level before starting the memory operation status checking period MOS_SEC. After the second interval ITV2 from operation S121_p, the memory controller MC may transmit a CE signal for enabling the memory device MD to the memory device MD in operation S150_1. In operation S151_1, the memory device MD may output a status signal at the second level to the memory controller MC in response to the CE signal. In operation S160, the memory device MD may check whether a corresponding memory operation is a pass status and change the signal (corresponding to the signal S1 generated by the control logic 121a as described above in FIG. 6A) from the second level to the first level indicating pass of the corresponding memory operation. In operation S150_q, the memory controller MC may transmit a CE signal for enabling the memory device MD to the memory device MD. In operation S151_q, the memory device MD may output a status signal at the second level indicating pass to the memory controller MC in response to the CE signal. In some example embodiments, the memory controller MC may periodically or aperiodically transmit CE signals for enabling the memory device MD 'q' times (where q is an integer equal to or greater than 1) in the memory operation status checking period MOS_SEC to the memory device MD.

In operation S170, the memory controller MC may check the internal status and the memory operation status of the memory device MD based on the level of status signals received during the internal status checking period IS_SEC and the memory operation status checking period MOS_SEC.

In some example embodiments, the memory controller MC may receive status signals during the internal status checking period IS_SEC and the memory operation status checking period MOS_SEC through the same status input pin. In greater detail, the memory controller MC may receive status signals during the internal status checking period IS_SEC and the memory operation status checking period MOS_SEC through an RnB pin.

Figure 9:
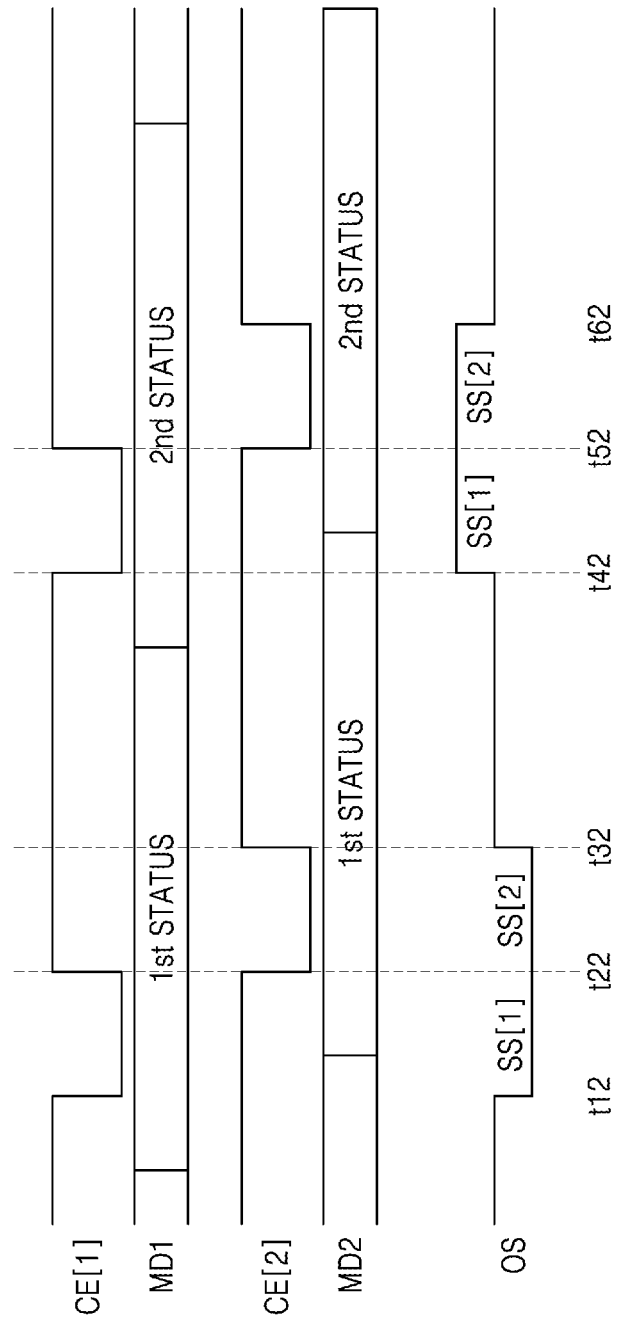
FIG. 9 is a timing diagram for describing an operating method of first and second memory devices according to some example embodiments of the inventive concepts.

FIG. 9 is a timing diagram for describing a method of operating first and second memory devices MD1 and MD2 according to some example embodiments of the inventive concepts. FIG. 9 shows an example in which the first and second memory devices MD1 and MD2 perform memory operations in response to commands received from a memory controller, respectively, and output first and second status signals SS[1] and SS[2] indicating memory operation status, respectively.

Referring to FIG. 9, a first memory device MD1 may be enabled from a time point 't12' to a time point 't22' by the CE signal CE[1], where the output signal OS received from the time point 't12' and the time point 't22' may correspond to the first status signal SS[1] at a low level indicating a first status of the memory operation status of the first memory device MD1. Thereafter, a second memory device MD2 may be enabled from the time point 't22' to a time point 't32' by the CE signal CE[1], where the output signal OS received from the time point 't22' and the time point 't32' may correspond to a second status signal SS[2] at a low level indicating a first status of the memory operation status of the second memory device MD2.

The first memory device MD1 may be enabled periodically or aperiodically by the CE signal CE[1] from a time point 't42' to a time point 't52' after the time point 't22', where the output signal OS received by a memory controller from the time point 't42' and the time point 't52' may correspond to the first status signal SS[1] at a high level indicating a second status of the memory operation status of the first memory device MD1. Thereafter, the second memory device MD2 may be enabled periodically or aperiodically by the CE signal CE[1] from the time point 't52' to a time point 't62' after the time point 't32', where the output signal OS received by the memory controller from the time point 't52' and the time point 't62' may correspond to the second status signal SS[2] at a high level indicating a second status of the memory operation status of the second memory device MD2.

Meanwhile, in a period in which the first and second memory devices MD1 and MD2 are disabled, the output signal OS may have a high-impedance level.

In some example embodiments, the memory controller may check the memory operation status of each of the first and second memory devices MD1 and MD2 based on the output signal OS, and may control the first and second memory devices MD1 and MD2 based on a check result. In greater detail, the memory controller may check the read operation status of the first and second memory devices MD1 and MD2 and, when a next read operation status is ready, transmit a next read command to the first and second memory devices MD1 and MD2. The memory controller may check the program operation status of the first and second memory devices MD1 and MD2 and re-transmit a corresponding program command to the first and second memory devices MD1 and MD2 when a corresponding program operation fails. Also, the memory controller may check the erase operation status of the first and second memory devices MD1 and MD2 and re-transmit a corresponding erase command to the first and second memory devices MD1 and MD2 when a corresponding erase operation fails. However, the above is merely one example embodiment, and the inventive concepts are not limited thereto. The memory controller may perform control of the first and second memory devices MD1 and MD2 by in various ways based on the type of a memory operation and the memory operation status of the first and second memory devices MD1 and MD2.

Figure 10A:
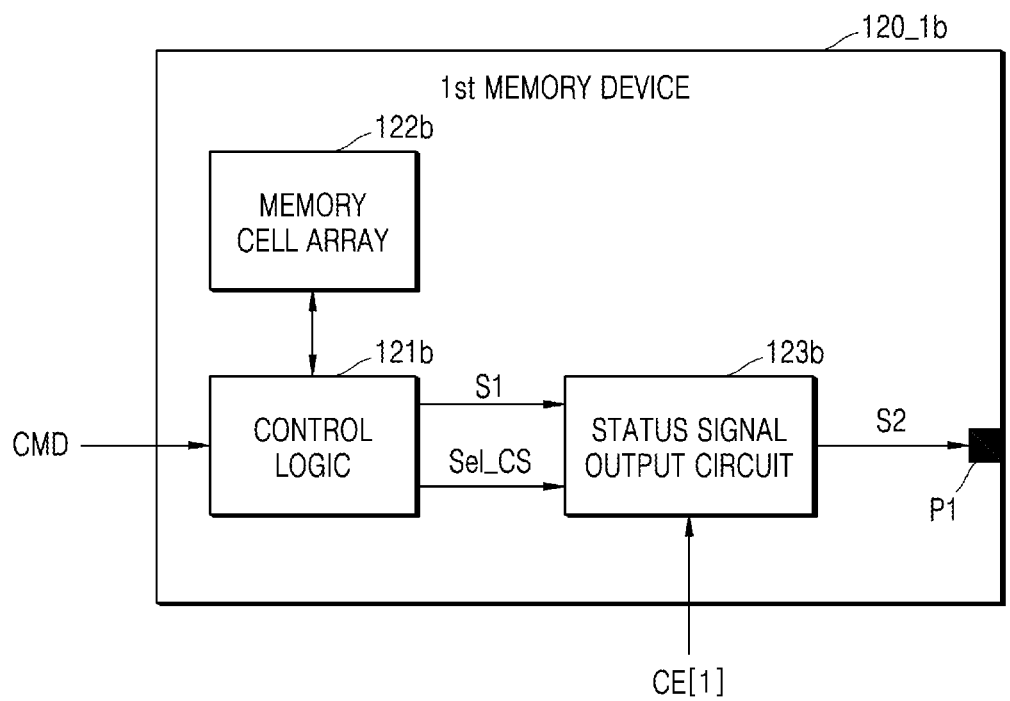
FIG. 10A is a block diagram showing a first memory device according to some example embodiments of the inventive concepts.
Figure 10B:
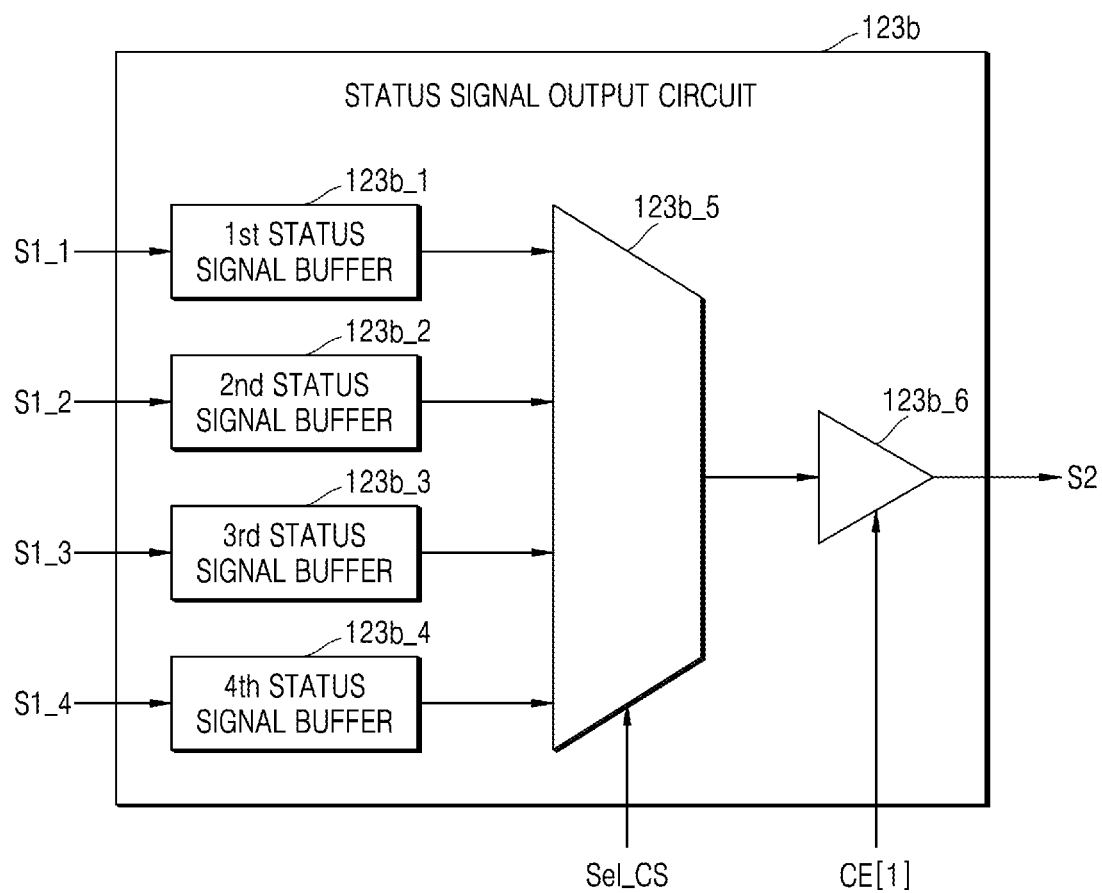
FIG. 10B is a block diagram showing a status signal output circuit of FIG. 10A.

FIG. 10A is a block diagram showing a first memory device 120_1b according to some example embodiments of the inventive concepts, and FIG. 10B is a block diagram showing a status signal output circuit 123b of FIG. 10A. The first memory device 120_1b of FIG. 10A may correspond to the first memory device 120_1 of FIG. 1A, and the status signal S2 of FIGS. 10A and 10B may correspond to the first status signal SS[1] of FIG. 1A.

Referring to FIG. 10A, the first memory device 120_1b may include a control logic 121b, a memory cell array 122b, and the status signal output circuit 123b. The control logic 121b may receive a command CMD and perform a memory operation corresponding to the command CMD by using the memory cell array 122b.

In some example embodiments, the control logic 121b may provide the signal S1 indicating the memory operation status to the status signal output circuit 123b in the memory operation status checking period after a memory operation corresponding to the command CMD is completed. Also, the control logic 121b may additionally provide a status selection control signal Sel_CS to the status signal output circuit 123b. The status selection control signal Sel_CS may be used by the status signal output circuit 123b to select and output any one of a plurality of status signals stored therein. The status signals may correspond to different memory operation status types, respectively. In some example embodiments, the status signal output circuit 123b may store signals S1 received from the control logic 121b according to the types of memory operations. In some embodiments, the status signal output circuit 123b may store the signal S1 indicating an internal status as described above. A detailed implementation example of the status signal output circuit 123*b* will be described herein with reference to FIG. 10B. In some example embodiments, the control logic 121*b* may generate the status selection control signal Sel_CS based on the most recently received command CMD. In some embodiments, the control logic 121*b* may generate the status selection control signal Sel_CS based on a memory operation status requested by a memory controller (not shown) to check or to be checked.

In some example embodiments, the status signal output circuit 123*b* may output the status signal S2 corresponding to the status selection control signal Sel_CS based on the CE signal CE[1] through the first status output pin P1 during a period in which the first memory device 120_1*b* is enabled in a memory operation status checking period, and may output the status signal S2 having a high-impedance level through the first status output pin P1 during a period in which the first memory device 120_1*b* is disabled.

Referring further to FIG. 10B, the status signal output circuit 123*b* may include first to fourth status signal buffers 123*b*_1 to 123*b*_4, a multiplexer 123*b*_5, and a 3-phase or tri-state inverter 123*b*_6. The first to fourth status signal buffers 123*b*_1 to 123*b*_4 may correspond to a program operation status, a read operation status, an erase operation status, and an internal status, respectively. In greater detail, a first status signal buffer 123*b*_1 may store a signal S1_1 corresponding to a program operation status, a second status signal buffer 123*b*_2 may store a signal S1_2 corresponding to the read operation status, a third status signal buffer 123*b*_3 may store a signal S1_3 corresponding to an erase operation status, and a fourth status signal buffer 123*b*_4 may store a signal S1_4 corresponding to an internal status.

The multiplexer 123*b*_5 may select any one of the first to fourth status signal buffers 123*b*_1 to 123*b*_4 based on the status selection control signal Sel_CS and provide a signal from a selected status signal buffer to the 3-phase inverter 123*b*_6. The 3-phase inverter 123*b*_6 may output a signal received from the multiplexer 123*b*_5 as the status signal S2 based on the CE signal CE[1].

The status signal output circuit 123*b* according to some example embodiments of the inventive concepts may selectively output status signals corresponding to various memory operation statuses, and thus a memory controller (not shown) may receive more easily the status signal S2 associated with a desired memory operation status regarding the first memory device 120_1*b* through a status input pin. Also, since the memory controller (not shown) may check the memory operation status of the first memory device 120_1*b* at any time, it may be free from the limit of arrangement of the memory operation status checking period of the first memory device 120_1*b*, and thus the first memory device 120_1*b* may be more effectively controlled.

Figure 11:
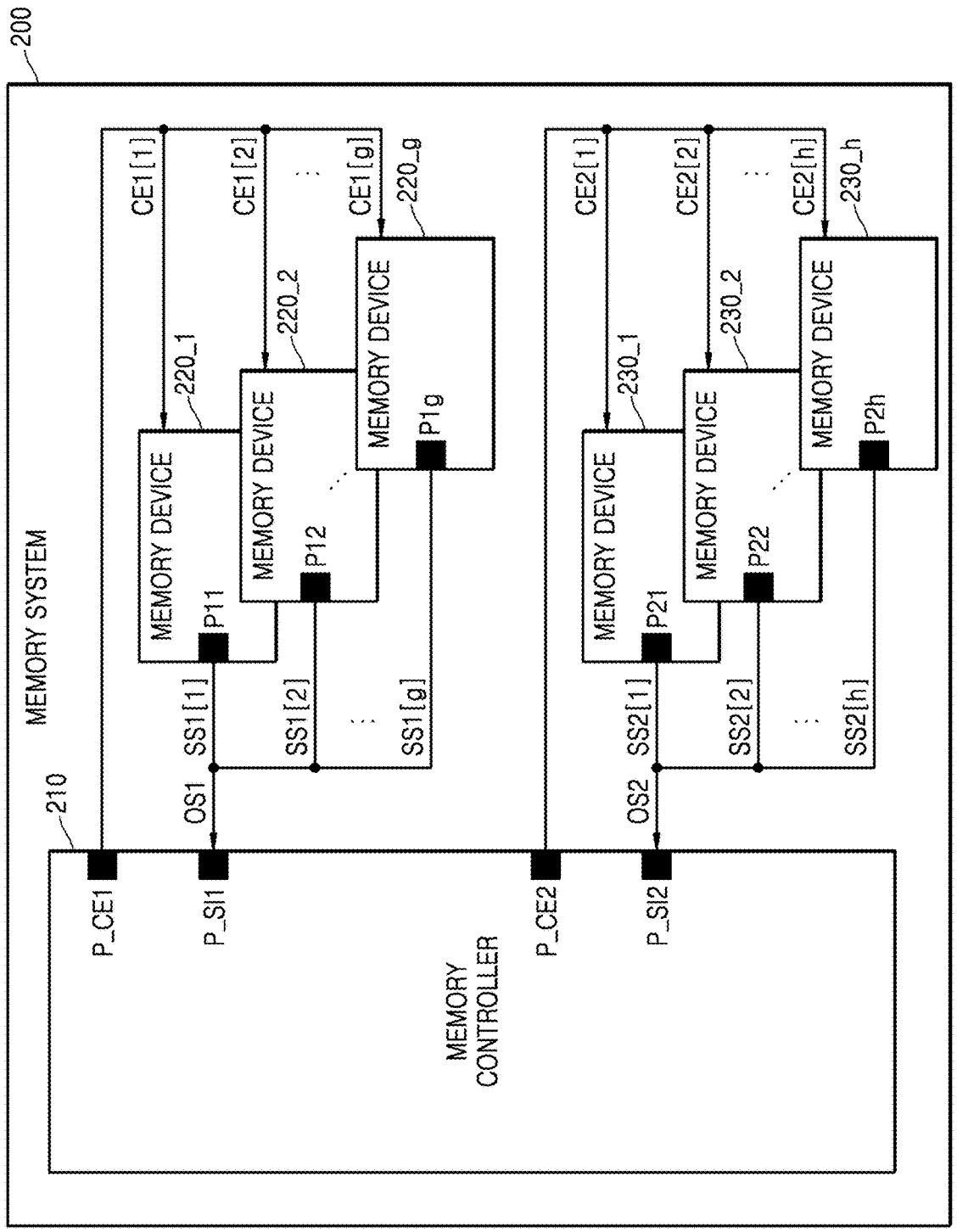
FIG. 11 is a block diagram showing a memory system according to some example embodiments of the inventive concepts.

FIG. 11 is a block diagram showing a memory system 200 according to some example embodiments of the inventive concepts.

Referring to FIG. 11, the memory system 200 may include a memory controller 210, the first memory devices 220_1 to 220_*g*, and the second memory devices 230_1 to 230_*h*. The memory controller 210 may include a first CE pin P_CE1, a second CE pin P_CE2, a first status input pin P_SI1, and a second status input pin P_SI2.

In some example embodiments, the first memory devices 220_1 to 220_*g* may include first to g-th state output pins P11 to P1*g* connected to the first status input pin P_SI1, respectively. The first memory devices 220_1 to 220_*g* may be connected to the first CE pin P_CE1, may receive first CE signals CE1[1] to CE1[*g*], and may be selectively enabled based on the first CE signals CE1[1] to CE1[*g*]. The second memory devices 230_1 to 230_*h* may include first to h-th state output pins P21 to P2*h* connected to the second status input pin P_SI2, respectively. The second memory devices 230_1 to 230_*h* may be connected to the second CE pin P_CE2, may receive second CE signals CE2[1] to CE2[*h*], and may be selectively enabled based on the second CE signals CE2[1] to CE2[*h*].

Herein, the first memory devices 220_1 to 220_*g* connected to the first status input pin P_SI1 may be defined as a first memory group, and second memory devices 230_1 to 230_*h* connected to the second status input pin P_SI2 may be defined as a second memory group.

In some example embodiments, the memory controller 210 may apply the same operation scheme or different operation schemes for checking the memory operation status of the first memory devices 220_1 to 220_*g* and the memory operation status of the second memory devices 230_1 to 230_*h*. In some embodiments, the operation scheme may be determined based on the memory characteristics of each of the first memory devices 220_1 to 220_*g* and the second memory devices 230_1 to 230_*h*.

In some example embodiments, an operation scheme for checking a memory operation status may include setup of levels indicating memory operation status, a start time of a memory operation status checking period, a duration of the memory operation status checking period, a sequence and a number of times that memory devices are enabled in the memory operation status checking period, or the like.

In some example embodiments, the memory controller 210 may receive a first output signal OS1 obtained through logical operation of the first status signals SS1[1] to SS1[*g*] from the first memory devices 220_1 to 220_*g* through the first status input pin P_SI1 and check the memory operation status of the first memory devices 220_1 to 220_*g* based on the first output signal OS1. Also, the memory controller 210 may check the memory operation status by additionally considering an operation scheme for checking the memory operation status of the first memory devices 220_1 to 220_*g*.

In some example embodiments, the memory controller 210 may receive a second output signal OS2 obtained through logical operation of second status signals SS2[1] to SS2[*h*] from the second memory devices 230_1 to 230_*h* through the second status input pin P_SI2 and check the memory operation status of the second memory devices 230_1 to 230_*h* based on the second output signal OS2. Also, the memory controller 210 may check the memory operation status by additionally considering an operation scheme for checking the memory operation status of the second memory devices 230_1 to 230_*h*.

Figure 12A:
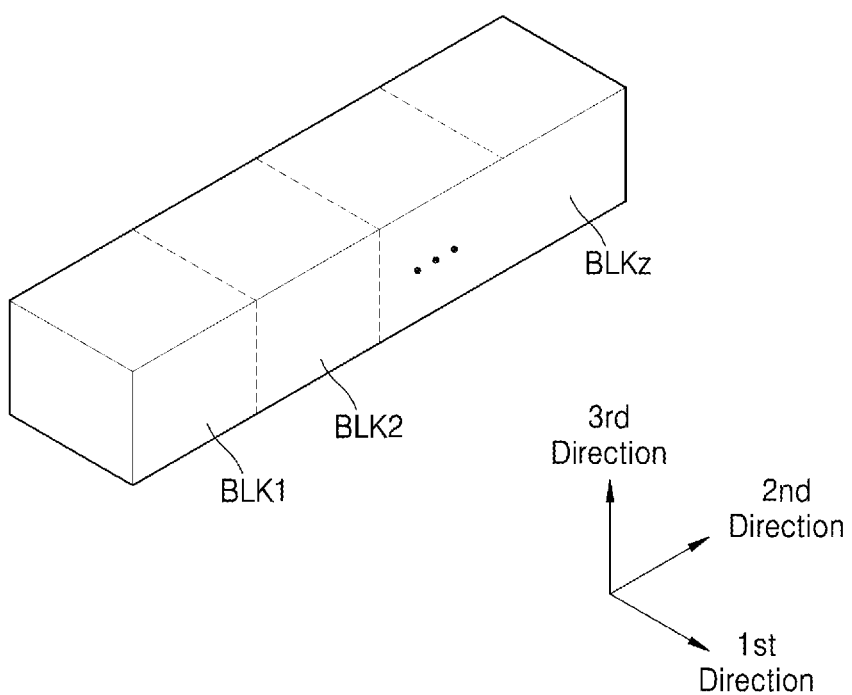
FIG. 12A is a block diagram showing a memory cell array of the first memory device of FIG. 6A.
Figure 12B:
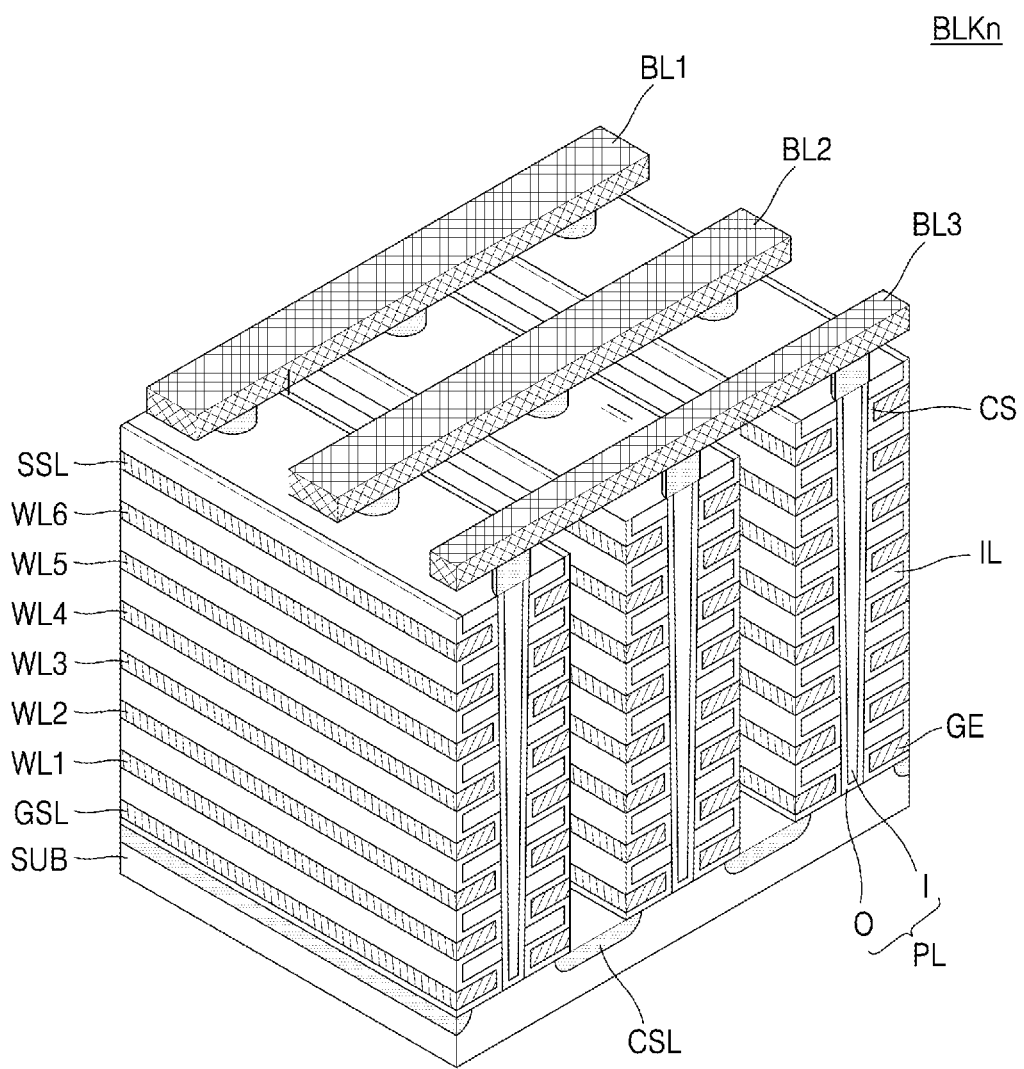
FIG. 12B is a diagram for describing a configuration of one memory block from among memory blocks of FIG. 12A.

FIG. 12A is a block diagram showing the memory cell array 122*a* of the first memory device 120_1*a* of FIG. 6A, and FIG. 12B is a diagram for describing the configuration of one memory block BLKn from among the memory blocks of FIG. 12A.

Referring to FIG. 12A, a memory cell array MCA may include a plurality of memory blocks BLK1 to BLKz. The memory blocks BLK1 to BLKz may each have a 3-dimensional structure (or a vertical structure). For example, the memory blocks BLK1 to BLKz may include structures extending in first to third directions, respectively. The memory blocks BLK1 to BLKz may each include a plurality of cell strings (not shown) extending in a second direction. The cell strings may be spaced apart from one another in the first and third directions. Cell strings (not shown) of one memory block are connected to a plurality of bit lines BL, a plurality of string select lines SSL, a plurality of word lines WL, a ground select line GSL or a plurality of ground select lines GSL, and a common source line (not shown). Cell strings (not shown) of the memory blocks BLK1 to BLKz may share the bit lines BL. For example, the bit lines BL may extend in the second direction and may be shared by the memory blocks BLK1 to BLKz.

Further referring to FIG. 12B, one memory block BLKn of the memory blocks BLK1 to BLKz of FIG. 12A may be formed in a direction perpendicular with respect to a substrate SUB. A common source line CSL is on or within the substrate SUB, and gate electrodes GE and an insulation layer IL are alternately stacked on the substrate SUB. Also, a charge storage layer CS may be formed between a gate electrode GE and the insulation layer IL.

When a plurality of gate electrodes GE and the insulation layers IL that are alternately stacked are vertically patterned, a V-shaped pillar PL is formed. The pillar PL may penetrate or extend through the gate electrodes GE and the insulation layers IL and may be connected to the substrate SUB. An outer portion O of the pillar PL may include a semiconductor material and may function as a channel, and an inner portion I of the pillar PL may include an insulation material such as silicon oxide.

The gate electrodes GE of the memory block BLKn may be respectively connected to a ground select line GSL, a plurality of word lines WL1 to WL6, and a string select line SSL. Also, the pillar PL of the memory block BLKn may be connected to a plurality of bit lines BL1 to BL3.

However, the memory block BLKn shown in FIG. 12B is merely one example embodiment for convenience of explanation of the inventive concepts, and the inventive concepts are not limited thereto. It will be fully understood that the inventive concepts may be applied to various implementations (including a 2-dimensional memory structure) of the memory block BLKn.

Figure 13:
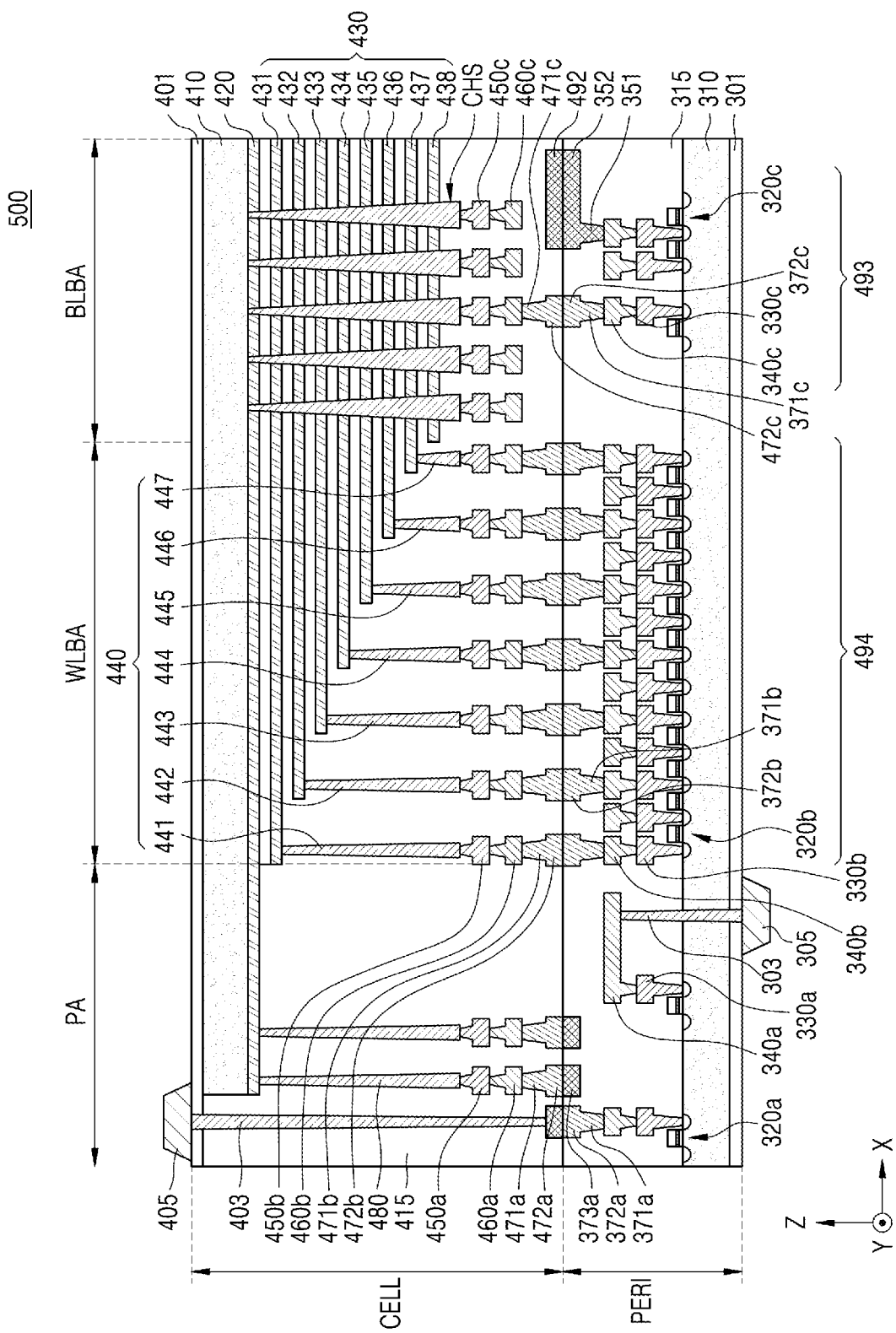
FIG. 13 is a diagram for describing a chip to chip (C2C) structure included in a memory device according to some example embodiments of the inventive concepts.

FIG. 13 is a diagram for describing a chip to chip (C2C) structure applied to a memory device 500 according to some example embodiments of the inventive concepts. The memory device 500 is one example implementation of the memory devices 120_1 to 120_n of FIG. 1A.

Referring to FIG. 13, the memory device 500 may have a C2C structure. The C2C structure may refer to a structure formed by fabricating an upper chip including a cell region CELL on a first wafer, fabricating a lower chip including a peripheral circuit region PERI on a second wafer different from the first wafer, and connecting the upper chip and the lower chip to each other through bonding. For example, the bonding may refer to an electric connection between a bonding metal formed on an uppermost (or lowermost) metal layer of the upper chip and a bonding metal formed on an uppermost (or lowermost) metal layer of the lower chip. For example, when the bonding metal includes copper (Cu), the bonding may be a Cu—Cu bonding, and the bonding metal may also include aluminum or tungsten.

The peripheral circuit region PERI and the cell region CELL of the memory device 500 may each include an external pad bonding region PA, a word line bonding region WLBA, and a bit line bonding region BLBA.

The peripheral circuit region PERI may include a first substrate 310, an interlayer insulation layer 315, a plurality of circuit elements 320a, 320b, and 320c formed on the first substrate 310, first metal layers 330a, 330b, and 330c respectively connected to the circuit elements 320a, 320b, and 320c, and second metal layers 340a, 340b, and 340c respectively formed on the first metal layers 330a, 330b, and 330c. In some embodiments, the first metal layers 330a, 330b, and 330c may include tungsten having relatively high resistance, whereas the second metal layers 340a, 340b, 340c may include copper having relatively low resistance.

Although only the first metal layers 330a, 330b, and 330c and the second metal layers 340a, 340b, and 340c are shown and described in the present specification, the inventive concepts are not limited thereto, and one or more metal layers may be further formed on the second metal layers 340a, 340b, and 340c. At least some of the one or more metal layers formed on the second metal layers 340a, 340b, and 340c may include a material like aluminum having a lower resistance than copper constituting the second metal layers 340a, 340b, and 340c.

The interlayer insulation layer 315 provided on the first substrate 310 may cover the circuit elements 320a, 320b, and 320c, the first metal layers 330a, 330b, and 330c, and the second metal layers 340a, 340b, and 340c and may include an insulation material such as a silicon oxide or a silicon nitride.

Lower bonding metals 371a and 372a may be formed on the second metal layer 340a in the external pad bonding region PA. Lower bonding metals 371b and 372b may be formed on the second metal layer 340b in the word line bonding area WLBA. In the word line bonding area WLBA, the lower bonding metals 371b and 372b in the peripheral circuit region PERI may be electrically connected to upper bonding metals 471b and 472b in the cell region CELL through bonding The lower bonding metals 371a, 372a, 371b, and 372b and the upper bonding metals 471a, 472a, 471b, and 472b may include aluminum, copper, or tungsten.

The cell region CELL may provide at least one memory block. The cell region CELL may include a second substrate 410 and a common source line 420. On the second substrate 410, a plurality of word lines 431 to 438 (collectively, word lines 430) may be stacked in a direction perpendicular to the top surface of the second substrate 410 (Z-axis direction). String select lines and a ground select line (not shown) may be arranged on top and bottom of the word lines 430, and the word lines 430 may be arranged between the string select lines and the ground select line.

In the bit line bonding area BLBA, a channel structure CHS may extend in a direction perpendicular to the top surface of the second substrate 410 and penetrate or extend through the word lines 430, the string select lines, and the ground select line. In some embodiments, the channel structure CHS may penetrate through the common source line 420. The channel structure CHS may include a data storage layer, a channel layer, and a buried insulation layer, and the channel layer may be electrically connected to a first metal layer 450c and a second metal layer 460c. For example, the first metal layer 450c may be a bit line contact, and the second metal layer 460c may be a bit line. In an embodiment, the bit line 460c may extend in a first direction parallel to the top surface of the second substrate 410 (Y-axis direction).

In the embodiment shown in FIG. 13, a region in which the channel structure CH and the bit line 460c are arranged may be defined as the bit line bonding area BLBA. The bit line 460c may be electrically connected to circuit elements 320c, which provide a page buffer 493 in the peripheral circuit region PERI, in the bit line bonding area BLBA. For example, the bit line 460c may be connected to upper bonding metals 471c and 472c in the peripheral circuit region PERI, and the upper bonding metals 471c and 472c may be connected to the lower bonding metals 371c and 372c that are connected to the circuit elements 320c of the page buffer 493. The lower bonding metals 371c and 372c and the upper bonding metals 471c and 472c may include aluminum, copper, or tungsten.

In the word line bonding area WLBA, the word lines 430 may extend in a second direction parallel to the top surface of the second substrate 410 (X-axis direction) and may be connected to a plurality of cell contact plugs 441 to 447 (collectively, cell contact plugs 440). The word lines 430 and the cell contact plugs 440 may be connected to each other at pads provided by at least some of the word lines 430 extending to different lengths in the second direction. A first metal layer 450b and a second metal layer 460b may be sequentially connected to the top of the cell contact plugs 440 connected to the word lines 430. In the word line bonding area WLBA, the cell contact plugs 440 may be connected to the peripheral circuit region PERI through the upper bonding metals 471b and 472b in the cell region CELL and the lower bonding metals 371b and 372b in the peripheral circuit region PERI.

The cell contact plugs 440 may be electrically connected to the circuit elements 320b that provide a row decoder 494 in the peripheral circuit region PERI. In some embodiments, an operating voltage of the circuit elements 320b providing the row decoder 494 may be different from an operating voltage of the circuit elements 320c providing the page buffer 493. For example, the operating voltage of the circuit elements 320c providing the page buffer 493 may be greater than the operating voltage of the circuit elements 320b providing the row decoder 494.

A common source line contact plug 480 may be provided in the external pad bonding area PA. The common source line contact plug 480 include a conductive material like a metal, a metal compound, or polysilicon and may be electrically connected to the common source line 420. A first metal layer 450a and a second metal layer 460a may be sequentially stacked on the common source line contact plug 480. For example, an area in which the common source line contact plug 480, the first metal layer 450a, and the second metal layer 460a are arranged may be defined as the external pad bonding area PA.

Meanwhile, input/output pads 305 and 405 may be arranged in the external pad bonding area PA. A lower insulation film 301 may cover the bottom surface of the first substrate 310 and may be formed under the first substrate 310, and a first input/output pad 305 may be formed on the lower insulation film 301. The first input/output pad 305 is connected to at least one of the circuit elements 320a, 320b, and 320c arranged in the peripheral circuit region PERI through a first input/output contact plug 303 and may be separated from the first substrate 310 by the lower insulation film 301. Also, a side insulation film (not shown) may be provided between the first input/output contact plug 303 and the first substrate 310 to electrically separate the first input/output contact plug 303 from the first substrate 310.

An upper insulation film 401 covering the top surface of the second substrate 410 may be formed on the second substrate 410, and a second input/output pad 405 may be provided on the upper insulation film 401. The second input/output pad 405 may be connected to at least one of the circuit elements 320a, 320b, and 320c arranged in the peripheral circuit region PERI through a second input/output contact plug 403.

According to some embodiments, the second substrate 410 and the common source line 420 may not be arranged in an area where the second input/output contact plug 403 is provided. Also, the second input/output pad 405 may not overlap the word lines 430 in the third direction (Z-axis direction). The second input/output contact plug 403 may be separated from the second substrate 410 in a direction parallel to the top surface of the second substrate 410 and may penetrate through an interlayer insulation layer 415 in the cell region CELL and be connected to the second input/output pad 405.

According to some embodiments, the first input/output pad 305 and the second input/output pad 405 may be selectively formed. For example, the memory device 500 may include only the first input/output pad 305 provided on the first substrate 310 or only the second input/output pad 405 provided on the second substrate 410. Alternatively, the memory device 500 may include both the first input/output pad 305 and the second input/output pad 405.

In each of the external pad bonding area PA and the bit line bonding area BLBA included in each of the cell region CELL and the peripheral circuit region PERI, a metal pattern of an uppermost metal layer may exist as a dummy pattern or the uppermost metal layer may be omitted.

In the memory device 500, in the external pad bonding area PA, in correspondence to an upper metal pattern 472a formed on the uppermost metal layer in the cell region CELL, a lower metal pattern 373a having the same shape as the upper metal pattern 472a in the cell region CELL may be formed on the uppermost metal layer in the peripheral circuit region PERI. The lower metal pattern 373a formed on the uppermost metal layer in the peripheral circuit region PERI may not be connected to a separate contact in the peripheral circuit region PERI. Similarly, in the external pad bonding area PA, in correspondence to a lower metal pattern formed on the uppermost metal layer in the peripheral circuit region PERI, an upper metal pattern having the same shape as the lower metal pattern in the peripheral circuit region PERI may be formed on the uppermost metal layer in the cell region CELL.

In the bit line bonding area BLBA, in correspondence to a lower metal pattern 352 formed on the uppermost metal layer in the peripheral circuit region PERI, an upper metal pattern 492 having the same shape as the metal pattern 352 may be formed on the uppermost metal layer in the cell region CELL. A contact may not be formed on the upper metal pattern 492 formed on the uppermost metal layer in the cell region CELL.

Figure 14:
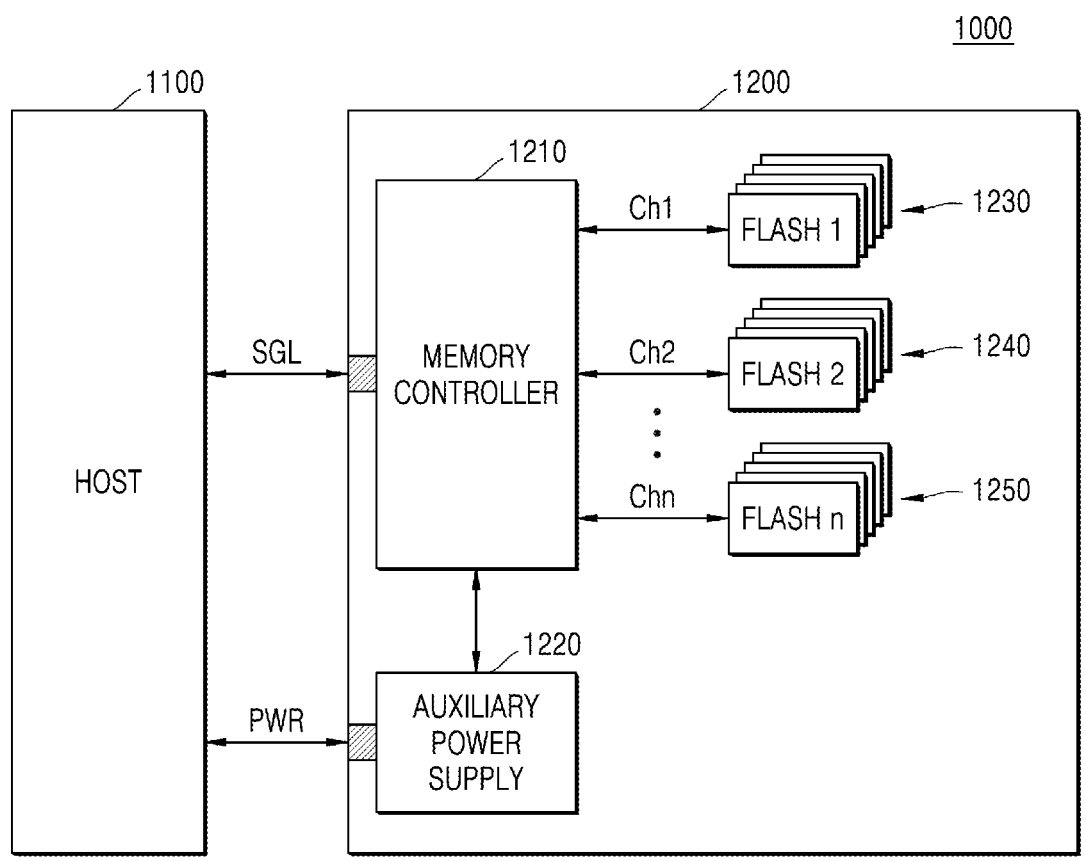
FIG. 14 is a block diagram showing a SSD system according to some example embodiments of the inventive concepts.

FIG. 14 is a block diagram showing a solid state drive (SSD) system 1000 according to some example embodiments of the inventive concepts.

Referring to FIG. 14, an SSD system 1000 may include a host 1100 and an SSD 1200. The SSD 1200 may exchange signals SGL with the host 1100 through a signal connector and receive power PWR through a power connector. The SSD 1200 may include a memory controller 1210, an auxiliary power supply device 1220, and a plurality of memory devices 1230, 1240, and 1250.

The memory controller 1210 may be connected to the memory devices 1230, 1240, and 1250 through channels Ch1, Ch2, and Ch3, and may check memory operation status according to example embodiments of the inventive concepts.

In some example embodiments, the host 1100 may provide a set feature command for setting a function associated with checking of memory operation status according to example embodiments of the inventive concepts to the SSD 1200, and the memory controller 1210 may set a function associated with checking of memory operation status in response to the set feature command. In some example embodiments, the memory controller 1210 may perform internal setting associated with a memory operation status checking operation based on specifications agreed with the memory devices 1230, 1240, and 1250 in advance.

In some example embodiments, the memory controller 1210 may apply different operation schemes associated with a memory operation status checking operation to the channel Ch1, Ch2, and Ch3, respectively.

Figure 15:
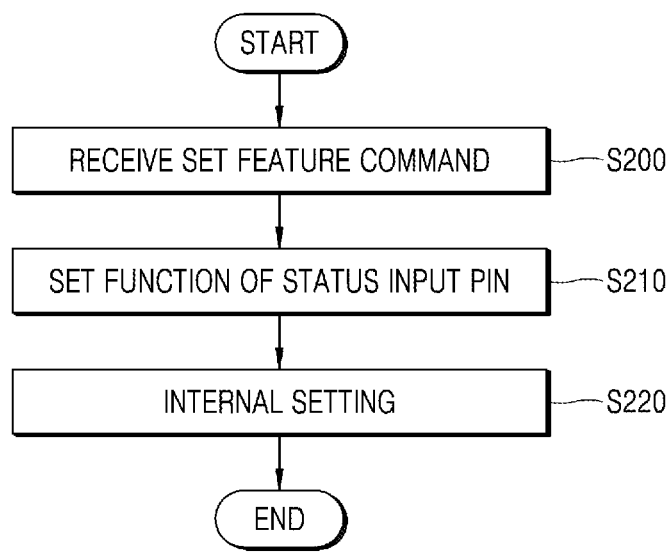
FIG. 15 is a flowchart of an operating method of a memory system according to some example embodiments of the inventive concepts.

FIG. 15 is a flowchart of a method of operating a memory system according to some example embodiments of the inventive concepts.

Referring to FIG. 15, in operation S200, a memory system may receive a set feature command from a host. In operation S210, the memory system may set a function of a status input pin in response to the set feature command. Herein, the function of a status input pin may refer to a function associated with checking a memory operation status according to example embodiments of the inventive concepts. In operation S220, the memory system may perform internal setting corresponding to the function of the status input pin. In greater detail, the memory system may include a memory controller and a plurality of memory devices, and the memory controller and the memory devices may perform internal setting associated with the function of the status input pin based on specifications agreed therebetween in advance.

Figure 16:
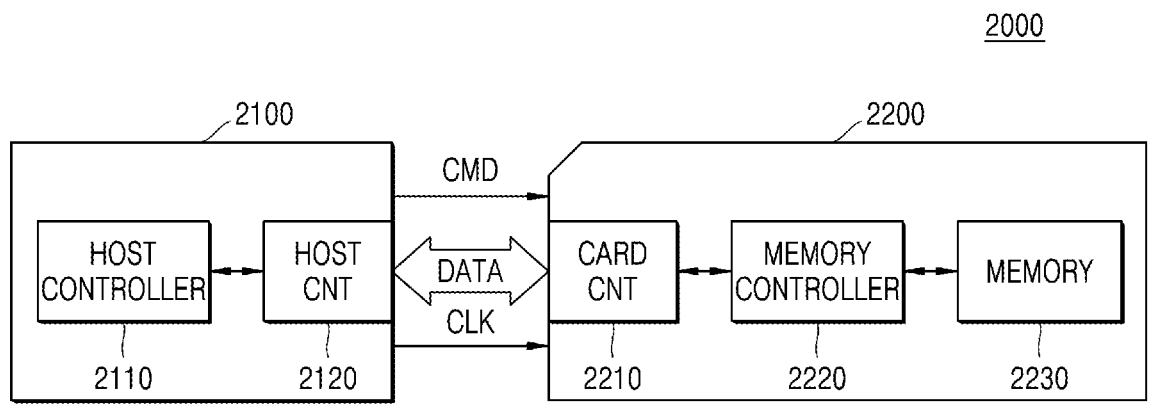
FIG. 16 is a block diagram showing an example in which a memory system according to some example embodiments of the inventive concepts is included in a memory card system.

FIG. 16 is a block diagram showing an example in which a memory system according to some example embodiments of the inventive concepts may be applied to a memory card system 2000.

Referring to FIG. 16, the memory card system 2000 may include a host 2100 and a memory card 2200. The host 2100 may include a host controller 2110 and a host connection unit 2120. The memory card 2200 may include a card connection unit 2210, a memory controller 2220, and a memory device 2230.

The host 2100 may write data to the memory card 2200 and/or read data stored in the memory card 2200. The host controller 2110 may transmit a command CMD, a clock signal CLK generated by a clock generator (not shown) present in the host 2100, and data to the memory card 2200 through the host connection unit 2120. The host 2100 may transmit a set feature command to the memory card 2200 to set a function associated with a memory operation status checking operation according to some example embodiments of the inventive concepts.

In response to a command received through the card connection unit 2210, the memory controller 2220 may store data in the memory device 2230 in synchronization with a clock signal generated by the clock generator (not shown) in the memory controller 2220. The memory device 2230 may store data transmitted from the host 2100. The memory controller 2220 and the memory device 2230 may set a corresponding function in response to the set feature command and may perform a memory operation status checking operation according to example embodiments of the inventive concepts.

The memory card 2200 may be implemented as a compact flash card (CFC), a microdrive, a smart media card (SMC), a multimedia card (MMC), a secure digital card (SDC), a memory stick, and/or a USB flash memory driver, as examples.

Some examples of embodiments have been disclosed in the drawings and specification as described above. Although the various embodiments discussed herein have been described by using specific terms in the present specification, the usage of such specific terms is primarily for the purpose of explaining the inventive concepts and is not intended to limit the scope of the inventive concepts described in the claims. In other words, while the inventive concepts have been particularly shown and described with reference to some examples of embodiments thereof, it will be understood that various changes in form and details may be made therein without departing from the scope of the following claims.

What is claimed is:

1. A memory system comprising:
   a plurality of first memory devices; and
   a memory controller comprising a first chip enable (CE) pin configured to output a first CE signal to enable selectively any one of the first memory devices, and a first status input pin configured to receive a first output signal indicating a memory operation status of an enabled first memory device from among the first memory devices during a first memory operation status checking period,
   wherein, in the first memory operation status checking period, the first output signal has one of a first level to indicate a first status of the memory operation status of the enabled first memory device, a second level to indicate a second status of the memory operation status of the enabled first memory device, or a third level to indicate a disabled status of the first memory devices,
   wherein the first output signal indicates an internal status of the enabled first memory device during an internal status checking period,
   wherein the first memory operation status checking period is subsequent to the internal status checking period with no intervening memory status check command therebetween, and
   wherein each of the plurality of memory devices is configured to reset a level of the first output signal to one of the first level or the second level between the first memory operation status checking period and the internal status checking period.

2. The memory system of claim 1, wherein the memory operation status comprises at least one of a status that indicates whether a second read operation following a first read operation in response to a read command from the memory controller is performable, a status that indicates whether a program operation in response to a program command from the memory controller is successful, and a status indicating whether an erase operation in response to an erase command from the memory controller is successful.

3. The memory system of claim 1, wherein each of the first memory devices comprises:
   a memory cell array comprising a plurality of memory cells;
   a control logic configured to perform a memory operation on the memory cell array in response to a command from the memory controller and configured to generate a signal having one of the first level and the second level according to a result of the memory operation; and
   a status signal output circuit configured to generate a status signal from the signal based on the first CE signal,
   wherein the first output signal is generated through a logical operation with respect to the status signals of the first memory devices.

4. The memory system of claim 3, wherein the status signal output circuit comprises:
   a status signal buffer configured to invert and amplify the signal; and
   a 3-phase inverter configured to re-invert the signal that is inverted and amplified in a period in which a memory device including the status signal output circuit is enabled according to the first CE signal, output a re-inverted signal as the status signal, and output the status signal having the third level in a period in which the memory device including the status signal output circuit is disabled according to the first CE signal.

5. The memory system of claim 1, wherein the internal status comprises either a busy status that indicates that a memory operation corresponding to a command from the memory controller is being performed or a ready status that indicates that the memory operation is completed.

6. The memory system of claim 5, wherein, in the internal status checking period, the first output signal has the first level to indicate the busy status of the enabled first memory device, the second level to indicate the ready status of the enabled first memory device, or the third level to indicate the disabled status of the first memory devices.

7. The memory system of claim 5, wherein the level of the first output signal is reset before the first memory operation status checking period starts.

8. The memory system of claim 1, wherein the memory controller is further configured to set a function indicating the memory operation status through the first output signal in response to a set feature command received from an external source.

9. The memory system of claim 1, further comprising:
a plurality of second memory devices,
wherein the memory controller further comprises a second CE pin configured to output a second CE signal to enable selectively any one of the second memory devices and a second status input pin configured to receive a second output signal that indicates a memory operation status of an enabled second memory device from among the second memory devices in a second memory operation status checking period.

10. The memory system of claim 9, wherein, in the second memory operation status checking period, the second output signal has one of a fourth level to indicate a third status of the memory operation status of the enabled second memory device, a fifth level to indicate a fourth status of the memory operation status of the enabled second memory device, or the third level to indicate the disabled status of the second memory devices.

11. The memory system of claim 1, wherein the first CE signal alternately enables the first memory devices a plurality of number of times in the first memory operation status checking period, and wherein the first output signal alternately indicates a memory operation status of the first memory devices in the first memory operation status checking period.

12. The memory system of claim 1, wherein the memory controller is further configured to check the memory operation status of the plurality of first memory devices based on the first output signal and control the first memory devices based on a check result.

13. The memory system of claim 1, wherein the first memory devices are coupled to the memory controller through the first CE pin and the first status input pin.

14. A memory system comprising:
a plurality of memory devices each comprising a status output pin; and
a memory controller comprising a status input pin coupled to the status output pins of the memory devices, and a chip enable (CE) pin configured to output a CE signal to enable the memory devices selectively,
wherein, in a memory operation status checking period, each of the memory devices is configured to output a status signal through the status output pin, the status signal having one of a first level that indicates a first status of a memory operation status or a second level that indicates a second status of the memory operation status during a first enabled period according to the CE signal, and has a third level in a first disabled period according to the CE signal,
wherein, in an internal status checking period, each of the memory devices is configured to output the status signal through the status output pin, the status signal having one of the first level that indicates a busy status, the second level that indicates a ready status during a second enabled period according to the CE signal, or the third level in a second disabled period according to the CE signal,
wherein the memory operation status checking period is subsequent to the internal status checking period by an interval, and
wherein each of the memory devices is further configured to reset a level of the status signal to one of the first level or the second level within the interval.

15. The memory system of claim 14, wherein the memory operation status comprises at least one of a status indicating whether a second read operation after a first read operation in response to a read command from the memory controller is performable, a status indicating whether a program operation in response to a program command from the memory controller is successful, and a status indicating whether an erase operation in response to an erase command from the memory controller is successful.

16. The memory system of claim 14, wherein the status signal indicates the memory operation status corresponding to a command received from the memory controller before the memory operation status checking period.

17. The memory system of claim 14, wherein the status signal indicates a memory operation status requested by the memory controller to be checked.

18. A memory system comprising:
a plurality of memory devices each configured to output a status signal that indicates a memory operation status during a first enabled period and after completing a first memory operation; and
a memory controller comprising a status input pin configured to receive an output signal generated from a plurality of status signals of the plurality of memory devices, the plurality of status signals comprising the status signal,
wherein the memory controller is configured to check the memory operation status of a first memory device enabled in the first enabled period from among the plurality of memory devices based on a level of the output signal received in the first enabled period, and wherein the memory operation status comprises at least one of whether a second memory operation following the first memory operation in response to a command from the memory controller is performable and whether the second memory operation in response to the command is successful,
wherein each of the plurality of memory devices is configured to output the status signal that indicates an internal status related to progress of the second memory operation during a second enabled period,
wherein the memory controller is configured to check the internal status of a second memory device enabled in the second enabled period from among the plurality of memory devices based on a level of the output signal received in the second enabled period, wherein each of the plurality of memory devices is configured to sequentially operate in the second enabled period and the first enabled period in response to the command, and wherein each of the memory devices is configured to reset the level of the output signal received during at least one of the first enabled period or the second enabled period to one of a first level or a second level.

* * * * *